United States Patent
Kang et al.

(10) Patent No.: US 11,765,382 B2
(45) Date of Patent: *Sep. 19, 2023

(54) METHOD AND APPARATUS FOR ENCODING AND DECODING VIDEO USING INTER-PREDICTION

(71) Applicants: Hyundai Motor Company, Seoul (KR); Kia Motors Corporation, Seoul (KR); Ewha University-Industry Collaboration Foundation, Seoul (KR)

(72) Inventors: Je Won Kang, Seoul (KR); Sang Hyo Park, Seoul (KR); Seung Wook Park, Yongin (KR); Wha Pyeong Lim, Hwaseong (KR)

(73) Assignees: Hyundai Motor Company, Seoul (KR); Kia Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,104

(22) Filed: Jul. 27, 2022

(65) Prior Publication Data
US 2022/0377368 A1   Nov. 24, 2022

Related U.S. Application Data

(63) Continuation of application No. 17/270,243, filed as application No. PCT/KR2020/008924 on Jul. 8, 2020, now Pat. No. 11,438,623.

(30) Foreign Application Priority Data

Jul. 8, 2019 (KR) .................. 10-2019-0081926
Dec. 18, 2019 (KR) .................. 10-2019-0170099
Jul. 8, 2020 (KR) .................. 10-2020-0083978

(51) Int. Cl.
*H04N 19/105* (2014.01)
*H04N 19/132* (2014.01)
(Continued)

(52) U.S. Cl.
CPC ......... *H04N 19/521* (2014.11); *H04N 19/105* (2014.11); *H04N 19/132* (2014.11);
(Continued)

(58) Field of Classification Search
CPC .. H04N 19/521; H04N 19/105; H04N 19/132; H04N 19/139; H04N 19/176; H04N 19/577; H04N 19/70
See application file for complete search history.

(56) References Cited

U.S. PATENT DOCUMENTS 10,154,289 B2   12/2018   Deshpande
2013/0129242 A1*   5/2013   Lin ................ H04N 19/117
                                                                      382/233
(Continued)

FOREIGN PATENT DOCUMENTS

JP          2019-017121 A       1/2019
KR   10-2017-0033471 A       3/2017
(Continued)

OTHER PUBLICATIONS

Esenlik, S., "BoG report on CE9 decoder motion vector derivation related contributions", Joint Video Experts Team (JVET) of ITU-T SG 16 WP 3 and ISO/IEC JTC 1/SC 29/WG 11, 15th Meeting: Gothenburg, SE, Jul. 3-12, 2019, 20 pages.
(Continued)

*Primary Examiner* — Jae N Noh
(74) *Attorney, Agent, or Firm* — Fox Rothschild LLP

(57) ABSTRACT

A coding tool is provided to improve the compression performance of inter prediction and is used at the encoder/decoder side to adjust the correction of a motion vector
(Continued)

based on a high level syntax. In addition, a method is provided for simply performing an integer sample search step of searching for an integer offset and a fractional sample refinement step of searching for a sub-pixel offset in relation to motion vector refinement among coding tools.

14 Claims, 11 Drawing Sheets

(51) Int. Cl.
  *H04N 19/176* (2014.01)
  *H04N 19/70* (2014.01)
  *H04N 19/513* (2014.01)
  *H04N 19/139* (2014.01)
  *H04N 19/577* (2014.01)

(52) U.S. Cl.
  CPC ......... *H04N 19/139* (2014.11); *H04N 19/176* (2014.11); *H04N 19/577* (2014.11); *H04N 19/70* (2014.11)

(56) References Cited

U.S. PATENT DOCUMENTS

| | | | |
|---|---|---|---|
| 2017/0214932 A1* | 7/2017 | Huang | H04N 19/537 |
| 2018/0241998 A1* | 8/2018 | Chen | H04N 19/176 |
| 2019/0200043 A1 | 6/2019 | Egilmez et al. | |
| 2019/0208144 A1 | 7/2019 | Purvin et al. | |

FOREIGN PATENT DOCUMENTS

| | | | | |
|---|---|---|---|---|
| KR | 10-2018-0129584 A | 12/2018 | | |
| WO | WO-2020183243 A1 * | 9/2020 | ........... | H04N 19/137 |

OTHER PUBLICATIONS

Chen, J. et al., "Algorithm description for Versatile Video Coding and Test Model 5 (VTM 5)", International Organization for Standardization, ISO/IEC JTC1/SC29/WG11 Coding of Moving Pictures and Audio, Mar. 2019, Geneva, Switzerland, 77 pages.

Brass, B. et al., "Versatile Video Coding (Draft 5)", Joint Video Experts Team (JVET) of ITU-T SG 16 WP 3 and ISO/IEC JTC 1/SC 29/WG 11, 14th Meeting: Geneva, Switzerland, Mar. 19-27, 2019, 406 pages.

Sethuraman, S., "Non-CE9: Header flags to disable DMVR and BDOF at finer granularities", Joint Video Experts Team (JVET) of ITU-T SG 16 WP 3 and ISO/IEC JTC I/SC 29/WG 11, 15th Meeting: Gothenburg, SE, Jul. 3-12, 2019, 3 pages.

Sethuraman, S., "Non-CE9: Header flags to disable DMVR and BDOF at finer granularities", Joint Video Experts Team (JVET) of ITU-T SG 16 WP 3 and ISO/IEC JTC 1/SC 29/WG 11, 15th Meeting: Gothenburg, SE, Jul. 3-12, 2019, 1 page.

Huang, H et al., "Non-CE9: DMVR and BDOF on/off control", Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

Extended European Search Report for European Patent Application No. 20836420.8, dated Jan. 23, 2023, 12 pages.

* cited by examiner

METHOD AND APPARATUS FOR ENCODING AND DECODING VIDEO USING INTER-PREDICTION

CROSS-REFERENCE TO RELATED APPLICATION

This application is a Continuation of application Ser. No. 17/270,243 filed on Feb. 22, 2021, which is a 35 U.S.C. § 371 U.S. national filing application of International Application No. PCT/KR2020/008924, filed Jul. 8, 2020, which claims priority to Patent Application No. 10-2020-0083978, filed on Jul. 8, 2020 in Korea, Patent Application No. 10-2019-0170099, filed on Dec. 18, 2019 in Korea, and Patent Application No. 10-2019-0081926, filed on Jul. 8, 2019 in Korea, the entire contents of which are incorporated herein by reference.

TECHNICAL FIELD

The present disclosure relates to encoding and decoding of a video, and more specifically, to a coding tool configured to improve compression performance of inter-prediction and a method for adjusting the correction of motion vectors using the coding tool at the encoder/decoder side based on a high-level syntax.

BACKGROUND ART

The statements in this section merely provide background information related to the present disclosure and may not constitute prior art. Since the volume of video data is greater than that of voice data or still image data, storing or transmitting video data without processing for compression requires a lot of hardware resources including memory.

Accordingly, in storing or transmitting video data, the video data is generally compressed using an encoder to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%. However, the picture size, resolution, and frame rate are gradually increasing, and accordingly the amount of data to be encoded is also increasing. Accordingly, a new compression technique having better encoding efficiency and higher image quality than the existing compression technique is required.

In video encoding, predictive encoding is mainly used to improve compression performance. There are intra-prediction for predicting a target block to be encoded based on pre-reconstructed samples in a current picture, and inter-prediction for predicting a current block using a pre-reconstructed reference picture. In particular, the inter-prediction is widely used for video encoding because it exhibits superior compression performance compared to intra-prediction.

The present disclosure proposes a coding tool for improving the compression performance of the existing inter-prediction.

SUMMARY

In the present disclosure, regarding a coding tool for improving compression performance of inter-prediction, a correction of motion vectors is adjusted using the coding tool at an encoder/decoder side based on a high-level syntax. It is a main object of the present disclosure to provide a method for simply performing an integer sample search operation and a fractional sample refinement operation in relation to motion vector refinement other coding tools.

In accordance with one aspect of the present disclosure, a video decoding method is provided for decoding a sequence of coded pictures on a block-by-block basis by a video decoding apparatus. The method includes: decoding at least one first high level syntax element indicating whether each of at least one coding tool from a bitstream is allowed, the at least one coding tool including motion vector refinement; decoding, from the bitstream, a second high level syntax element corresponding to each of the at least one coding tool depending on the at least one first high level syntax element and setting, at a picture level, whether each of the at least one coding tool is allowed; when it is identified that the motion vector refinement is allowed for a current picture including a target block based on the setting at the picture level, generating a refined motion vector for the target block by calculating a metric between two candidate blocks within a preset offset range from initial motion vectors in bi-directional reference pictures of the target block and searching for a motion vector candidate having a minimum metric; and generating inter-prediction samples for the target block using the bi-directional reference pictures and the refined motion vector.

In accordance with another aspect of the present disclosure, a video decoding apparatus is provided for decoding a sequence of coded pictures on a block-by-block basis. The apparatus includes: a decoder configured to decode at least one first high level syntax element indicating whether each of at least one coding tool from a bitstream is allowed, and decode, from the bitstream, a second high level syntax element corresponding to each of the at least one coding tool depending on the at least one first high level syntax element and setting, at a picture level, whether each of the at least one coding tool is allowed, the at least one coding tool including motion vector refinement; and a predictor configured to generate, in response to identifying that the motion vector refinement is allowed for a current picture including a target block based on the setting at the picture level, a refined motion vector for the target block by calculating a metric between two candidate blocks within a preset offset range from initial motion vectors in bi-directional reference pictures of the target block and searching for a motion vector candidate having a minimum metric, wherein the predictor generates inter-prediction samples for the target block using the bi-directional reference pictures and the refined motion vector.

In accordance with another aspect of the present disclosure, a video encoding method is provided for encoding a sequence of coded pictures on a block-by-block basis by a video encoding apparatus. The method includes: encoding, in a sequence header, at least one first high level syntax element indicating whether each of at least one coding tool is allowed, the at least one coding tool including motion vector refinement; encoding a second high level syntax element of a picture level related to whether each of the at least one coding tool is allowed depending on the at least one first high level syntax element; when it is identified that the motion vector refinement is allowed for a current picture including a target block based on setting of the picture level, generating a refined motion vector for the target block by calculating a metric between two candidate blocks within a preset offset range from initial motion vectors in bi-directional reference pictures of the target block and searching for a motion vector candidate having a minimum metric; and generating inter-prediction samples for the target block using the bi-directional reference pictures and the refined motion vector.

As is apparent from the above description, according to the present embodiment, a method is provided for simply performing an integer sample search operation and a fractional sample refinement operation in relation to motion vector refinement among coding tools for improving compression performance of inter-prediction. Thereby, coding efficiency of the encoder/decoder may be enhanced and accordingly complexity may be reduced.

DETAILED DESCRIPTION

Figure 1:
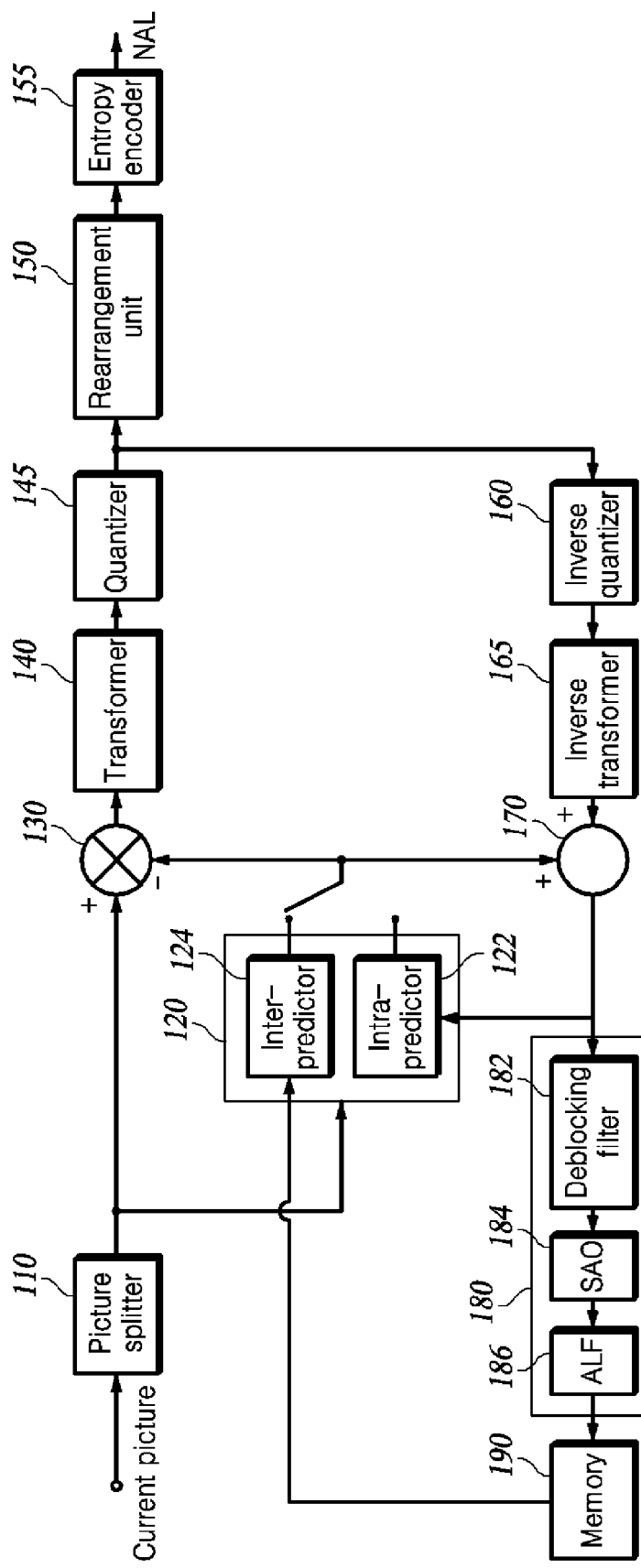
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of embodiments of the present disclosure, a detailed description of known functions and configurations incorporated herein will be omitted to avoid obscuring the subject matter of the embodiments.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190. Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header.

In addition, information referred to by one or more SPSs in common is encoded in a video parameter set (VPS). Furthermore, information which a plurality of pictures refers to in common is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

The picture splitter 110 is configured to determine the size of a coding tree unit (CTU). Information about the size of the CTU (CTU size) is encoded as a syntax of the SPS or PPS and is transmitted to the video decoding apparatus. The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
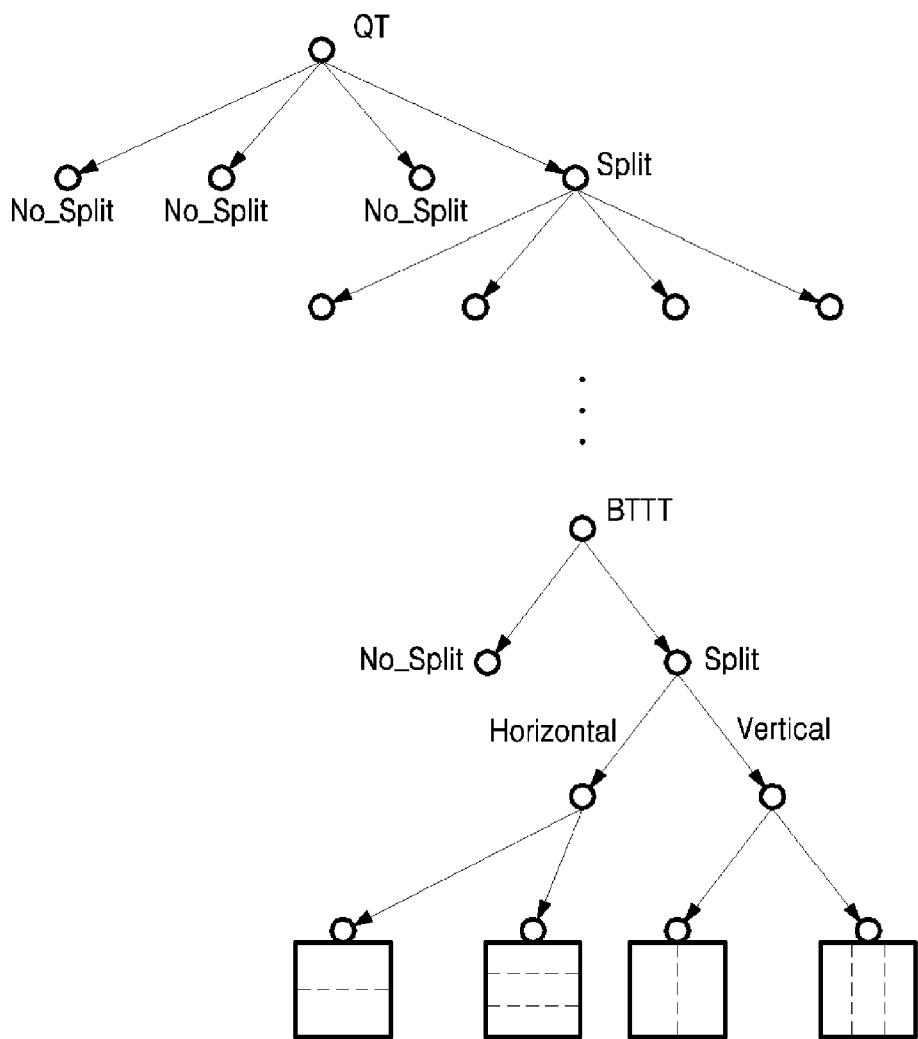
FIG. 2 exemplarily shows block partitioning structure using a QTBTTT structure.

FIG. 2 is a diagram illustrating a method for splitting a block using a QTBTTT structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is equal to or less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

Further, CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular. The predictor 120 is configured to predict the current block to generate a prediction block. The predictor 120 includes an intra-predictor 122 and an inter-predictor 124.

In general, each of the current blocks in a picture may be predictively coded. In addition, prediction of a current block may be performed using an intra-prediction technique (which uses data from a picture containing the current block) or an inter-prediction technique (which uses data from a picture coded before the picture containing the current block). The inter-prediction includes both unidirectional prediction and bi-directional prediction.

Figure 3A:
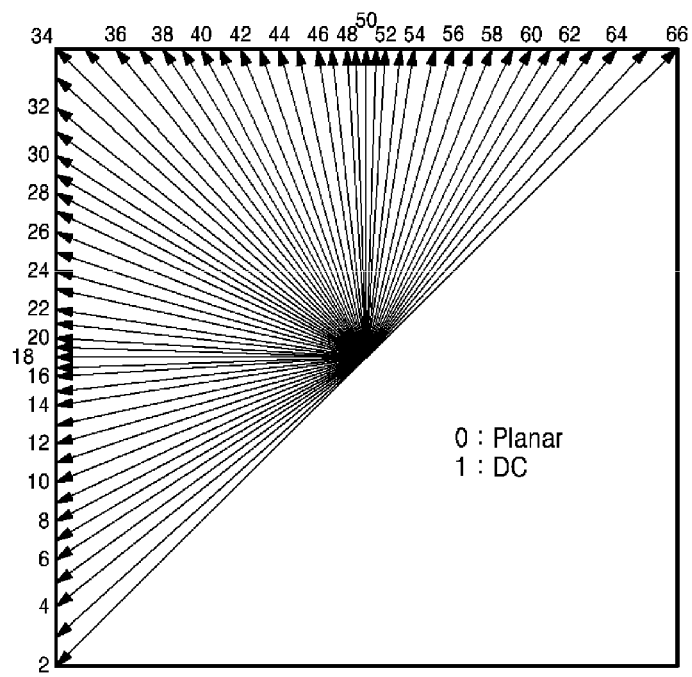
FIG. 3A-3B exemplarily show a plurality of intra-prediction modes including wide angle intra-prediction modes.
Figure 3B:
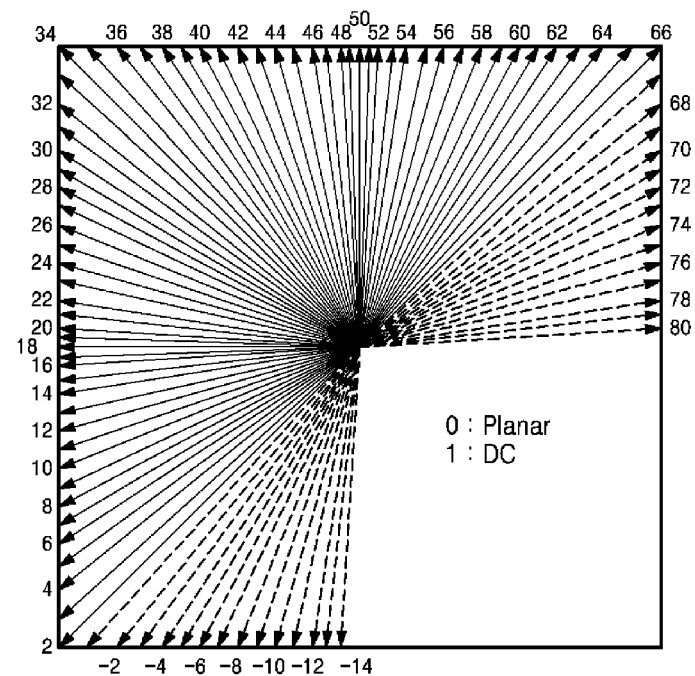

The intra-prediction unit 122 is configured to predict pixels in the current block using pixels (reference pixels) positioned around the current block in the current picture including the current block. There is a plurality of intra-prediction modes according to the prediction directions. For example, as shown in FIGS. 3A-3B, the plurality of intra-prediction modes may include two non-directional modes, which include a planar mode and a DC mode, and 65 directional modes. Neighboring pixels and an equation to be used are defined differently for each prediction mode.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape.

In particular, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with a width greater than the height thereof.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and select an intra-prediction mode that has the best rate distortion characteristics among the tested modes.

The intra-predictor 122 is configured to select one intra-prediction mode from among the plurality of intra-prediction modes, and predict the current block using neighboring pixels (reference pixel) and an equation determined according to the selected intra-prediction mode. Information about the selected intra-prediction mode is encoded by the entropy encoder 155 and transmitted to the video decoding apparatus.

The inter-predictor 124 is configured to generate a prediction block for the current block through motion compensation. The inter-predictor 124 is configured to search for a block most similar to the current block in a reference picture which has been encoded and decoded earlier than the current picture, and generate a prediction block for the current block using the searched block. Then, the inter-predictor is configured to generate a motion vector (MV) corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may be configured to perform interpolation on a reference picture or a reference block to increase prediction accuracy. In other words, subsamples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit.

The precision or resolution of the motion vector may be set differently for each target region to be encoded, for example, each unit such as a slice, tile, CTU, or CU. When such an adaptive motion vector resolution (AMVR) is applied, information about motion vector resolution to be applied to each target region should be signaled for each target region. For example, when the target region is a CU, information about the motion vector resolution applied to each CU is signaled. The information about the motion vector resolution may be information indicating the precision of a motion vector difference which will be described later.

The inter-predictor 124 may be configured to perform inter-prediction using bi-prediction. In bi-directional prediction, the inter-predictor 124 uses two reference pictures and two motion vectors representing block positions most similar to the current block in the respective reference pictures. The inter-predictor 124 is configured to select a first reference picture and a second reference picture from reference picture list 0 (RefPicList0) and reference picture list 1 (RefPicList1), respectively, search for blocks similar to the current block in the respective reference pictures, and generate a first reference block and a second reference block. Then, the inter-predictor 124 is configured to generate a prediction block for the current block by averaging or weighting the first reference block and the second reference block. The inter-predictor 124 is then configured to transfer motion information including information about the two reference pictures and the two motion vectors used to predict the current block to the encoder 150. In particular, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0, and conversely, and pre-reconstructed pictures preceding the current picture may be further included in RefPicList1.

Various methods may be used to minimize the number of bits required to encode the motion information. For example, when the reference picture and motion vector of the current block are the same as the reference picture and motion vector of a neighboring block, the motion information about the current block may be transmitted to the video decoding apparatus by encoding information for identifying the neighboring block. This method is called a "merge mode."

Figure 4:
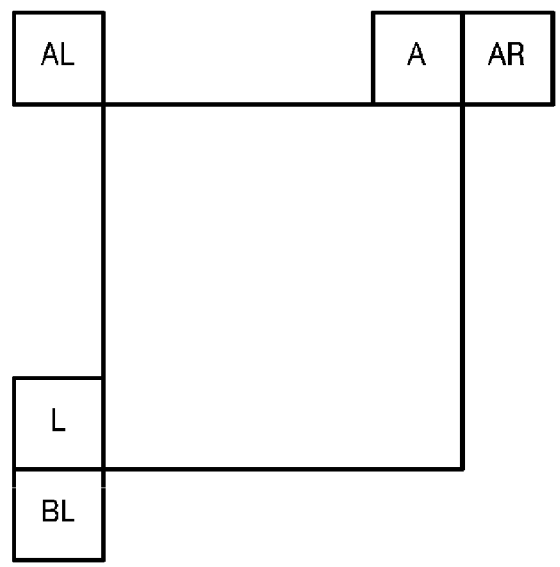
FIG. 4 exemplarily shows neighboring blocks around a current block.

In the merge mode, the inter-predictor 124 is configured to select a predetermined number of merge candidate blocks (hereinafter referred to as "merge candidates") from among the neighboring blocks of the current block. As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may be additionally used as merge candidates.

The inter-predictor 124 configures a merge list including a predetermined number of merge candidates using such neighboring blocks. The inter-predictor 124 is configured to select a merge candidate to be used as the motion information about the current block from among the merge candidates included in the merge list, and generate merge index information for identifying the selected candidates. The generated merge index information is encoded by the encoder 155 and transmitted to the video decoding apparatus.

Another method of encoding the motion information is an advanced motion vector prediction (AMVP) mode. In the AMVP mode, the inter-predictor 124 is configured to derive predicted motion vector candidates for the motion vector of the current block by using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates.

In addition, a block positioned within a reference picture (which may be the same as or different from the reference picture used to predict the current block) other than the current picture including the current block may be used as the neighboring blocks used to derive the predicted motion vector candidates. For example, a co-located block which is at the same position as the current block or blocks adjacent to the collocated block in the reference picture may be used. The inter-predictor 124 is configured to derive predicted motion vector candidates using the motion vectors of the neighboring blocks, and determine a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In particular, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In particular, information for identifying the selected predicted motion vector candidate is further encoded along with the information about the motion vector difference and the information about the reference picture which are to be used to predict the current block. The subtractor 130 is configured to subtract the prediction block generated by the intra-predictor 122 or the inter-predictor 124 from the current block to generate a residual block.

The transformer 140 is configured to transform the residual signal in the residual block having pixel values in the spatial domain into transform coefficients in the frequency domain. The transformer 140 may be configured to transform residual signals in the residual block using the entire size of the residual block as a transformation unit. Alternatively, the transformer 140 may be configured to split the residual block into a plurality of subblocks, and perform the transformation using the subblock as a transform unit. Alternatively, the residual signals may be transformed by dividing the block into two subblocks, which are a transform region and a non-transform region, and using only the transform region subblock as a transform unit.

Particularly, the transform region subblock may be one of two rectangular blocks having a size ratio of 1:1 based on the horizontal axis (or vertical axis). In this case, a flag (cu_sbt_flag) indicating that only subblocks have been transformed, directionality (vertical/horizontal) information (cu_sbt_horizontal_flag) and/or position information (cu_sbt_pos_flag) are encoded by the entropy encoder 155 and signaled to the video decoding apparatus. In addition, the size of the transform region subblock may have a size ratio of 1:3 based on the horizontal axis (or vertical axis). In particular, a flag (cu_sbt_quad_flag) distinguishing the corresponding splitting is additionally encoded by the entropy encoder 155 and signaled to the video decoding apparatus.

The transformer 140 may be configured to transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may be configured to select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus.

The quantizer 145 is configured to quantize transform coefficients output from the transformer 140 using quantization parameters, and output the quantized transform coefficients to the entropy encoder 155. For some blocks or frames, the quantizer 145 may be configured to directly quantize a related residual block without transformation. The quantizer 145 may be configured to apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may be configured to re-sort the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a direct current (DC) coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 is configured to encode information such as a CTU size, a CU split flag, a QT split flag, an MTT splitting type, and an MTT splitting direction, which are associated with block splitting, such that the video decoding apparatus may split the block in the same manner as in the video encoding apparatus.

In addition, the entropy encoder 155 is configured to encode information about a prediction type indicating whether the current block is encoded by intra-prediction or inter-prediction, and encode intra-prediction information (i.e., information about an intra-prediction mode) or inter-prediction information (a merge index for the merge mode, information about a reference picture index and a motion vector difference for the AMVP mode) according to the prediction type. The entropy encoder 155 is also configured to encode information related to quantization, that is, information about quantization parameters and information about a quantization matrix.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block. The adder 170 is configured to add the reconstructed residual block to the prediction block generated by the predictor 120 to reconstruct the current block. The pixels in the reconstructed current block are used as reference pixels in performing intra-prediction of a next block.

The loop filter unit 180 is configured to filter the reconstructed pixels to reduce blocking artifacts, ringing artifacts, and blurring artifacts generated due to block-based prediction and transformation/quantization. The loop filter unit 180 may include at least of a deblocking filter 182, a sample adaptive offset (SAO) filter 184, and an adaptive loop filter (ALF) 186. The deblocking filter 182 is configured to filter the boundary between the reconstructed blocks to remove blocking artifacts caused by block-by-block coding/decoding, and the SAO filter 184 is configured to perform additional filtering on the deblocking-filtered video.

In particular, the SAO filter 184 is a filter used to compensate for a difference between a reconstructed sample and an original sample caused by lossy coding, and performs filtering in a manner that adding a corresponding offset to each reconstructed sample. The ALF 186 is configured to perform filtering on a target sample to be filtered by applying filter coefficients to the target sample and neighboring samples of the target sample. The ALF 186 may be configured to divide the samples included in a picture into predetermined groups, and then determine one filter to be applied to a corresponding group to differentially perform filtering on each group. Information about filter coefficients to be used for the ALF may be encoded and signaled to the video decoding apparatus. The reconstructed blocks filtered by the loop filter unit 180 are stored in the memory 190. Once all blocks in one picture are reconstructed, the reconstructed picture may be used as a reference picture for inter-prediction of blocks in a picture to be encoded next.

Figure 5:
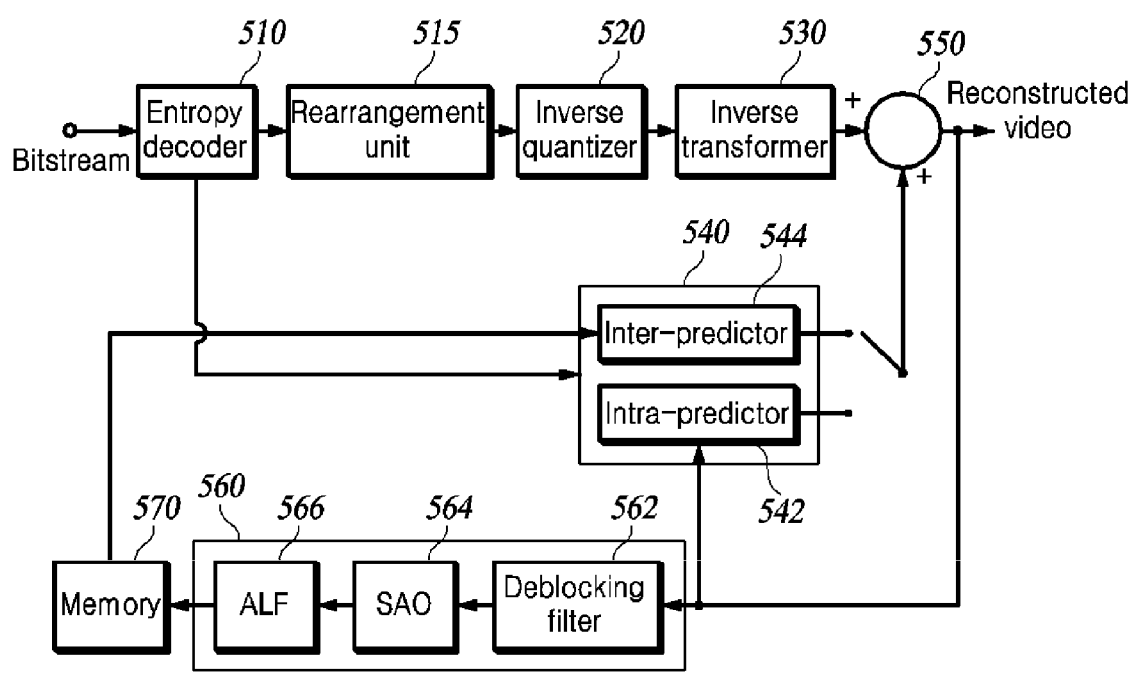
FIG. 5 is an exemplary block diagram of a video decoding apparatus capable of implementing the techniques of the present disclosure.

FIG. 5 is an exemplary functional block diagram of a video decoding apparatus capable of implementing the techniques of the present disclosure. Hereinafter, the video decoding apparatus and elements of the apparatus will be described with reference to FIG. 5.

The video decoding apparatus may include an entropy decoder 510, a rearrangement unit 515, an inverse quantizer 520, an inverse transformer 530, a predictor 540, an adder 550, a loop filter unit 560, and a memory 570. Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 is configured to determine a current block to be decoded by decoding a bitstream generated by the video encoding apparatus and extracting information related to block splitting, and extract prediction information and information about a residual signal, and the like required to reconstruct the current block. The entropy decoder 510 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times. As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 is configured to extract information about a prediction type indicating whether the current block is intra-predicted or inter-predicted. When the prediction type information indicates intra-prediction, the entropy decoder 510 is configured to extract a syntax element for the intra-prediction information (intra-prediction mode) for the current block. When the prediction type information indicates inter-prediction, the entropy decoder 510 is configured to extract a syntax element for the inter-prediction information, that is, information indicating a motion vector and a reference picture referred to by the motion vector.

The entropy decoder 510 is also configured to extract information about quantized transform coefficients of the current block as information related to quantization and information about residual signals. The rearrangement unit 515 may be configured to change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 is configured to inversely quantize the quantized transform coefficients, and inversely quantizes transform coefficients quantized using the quantization parameter. The inverse quantizer 520 may be configured to apply different quantization coefficients (scaling values) to the quantized transform coefficients arranged in two dimensions. The inverse quantizer 520 may be configured to perform inverse quantization by applying a matrix of quantization coefficients (scaling values) from the video encoding apparatus to a two-dimensional array of quantized transform coefficients. The inverse transformer 530 is configured to inversely transform the inversely quantized transform coefficients from the frequency domain to the spatial domain to reconstruct residual signals, thereby generating a residual block for the current block.

In addition, when the inverse transformer 530 inversely transforms only a partial region (subblock) of the transform block, it extracts a flag (cu_sbt_flag) indicating that only the subblock of the transform block has been transformed, the directionality (vertical/horizontal) information about the subblock (cu_sbt_horizontal_flag), and/or position information about the subblock (cu_sbt_pos_flag), and inversely transforms the transform coefficients of the subblock from the frequency domain to the spatial domain. Then, it reconstructs residual signals, and fills a region that is not inversely transformed with the value of "0" as a residual block, thereby generating the final residual block for the current block.

In addition, when the MTS is applied, the inverse transformer 530 is configured to determine transform functions or transform matrices to be applied in the horizontal and vertical directions, respectively, using the MTS information (mts_idx) signaled from the video encoding apparatus, and use the determined transform functions to inversely transform the transform coefficients in the transform block in the horizontal and vertical directions. The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction.

The intra-predictor 542 is configured to determine an intra-prediction mode of the current block among a plurality of intra-prediction modes based on the syntax element for the intra-prediction mode extracted from the entropy decoder 510, and predict the current block using the reference pixels around the current block according to the intra-prediction mode. The inter-predictor 544 is configured to determine a motion vector of the current block and a reference picture referred to by the motion vector using the syntax element for the intra-prediction mode extracted from the entropy decoder 510, and predict the current block based on the motion vector and the reference picture.

The adder 550 is configured to reconstruct the current block by adding the residual block output from the inverse transformer and the prediction block output from the inter-predictor or the intra-predictor. The pixels in the reconstructed current block are used as reference pixels in intra-predicting a block to be decoded next. The loop filter unit 560 may include a deblocking filter 562 and an SAO filter 564. The deblocking filter 562 deblocking-filters the boundary between the reconstructed blocks to remove blocking artifacts caused by block-by-block decoding.

The SAO filter 564 is configured to perform additional filtering on the reconstructed block after deblocking filtering to compensate for a difference between the reconstructed pixel and the original pixel caused by lossy coding. The ALF 566 is configured to perform filtering on a target sample to be filtered by applying filter coefficients to the target sample and neighboring samples of the target sample. The ALF 566 may be configured to divide the samples in a picture into predetermined groups, and then determine one filter to be applied to a corresponding group to differentially perform filtering on each group. The filter coefficient of the ALF is determined based on the information about the filter coefficient decoded from the bitstream. The reconstructed block filtered by the loop filter unit 560 is stored in the memory 570. When all blocks in one picture are reconstructed, the reconstructed picture is used as a reference picture for inter-prediction of blocks in a picture to be encoded next.

The present embodiment relates to encoding and decoding of a video as described above. More specifically, regarding a coding tool that improves the compression performance of inter-prediction, the encoder/decoder adjusts the correction of motion vectors using the coding tool based on a high-level syntax. In addition, the present embodiment provides a method for simply performing an integer sample search operation of searching for an integer offset and a fractional sample refinement operation of searching for a subpixel offset, in relation to motion vector refinement among the coding tools.

The following embodiment relates to coding tools for improving compression performance of inter-prediction, which may be operated by the inter-predictor 124 of the video encoding apparatus and the inter-predictor 544 of the video decoding apparatus. As used herein, the term "target block" may have the same meaning as the current block or coding unit (CU) described above, or may mean a partial region of a CU.

I. Bi-Directional Optical Flow (BDOF)

Figure 6:
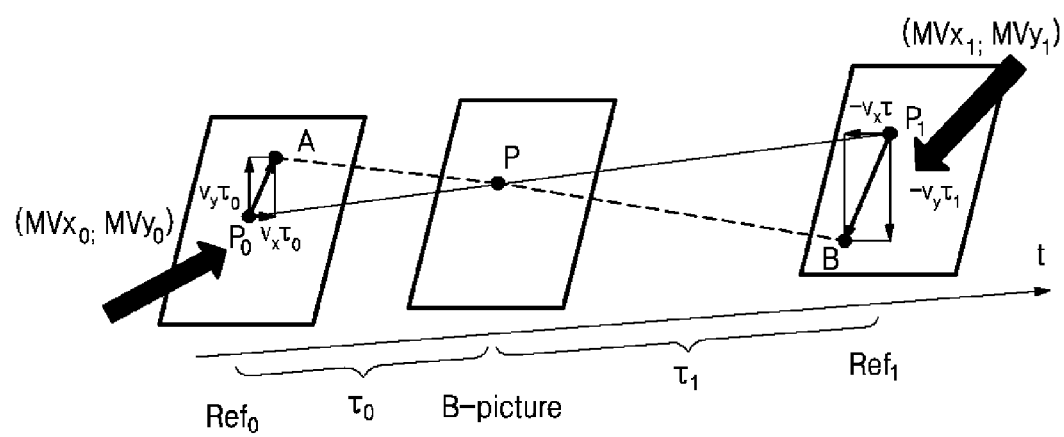
FIG. 6 is an exemplary diagram illustrating the concept of BDOF according to an embodiment of the present disclosure.

Bi-directional optical flow is a technique for additionally compensating for motions of samples predicted using bi-directional motion prediction, on the assumption that samples or objects constituting a video moves at a constant speed and that there is little change in sample values. FIG. 6 is an exemplary diagram illustrating the concept of BDOF according to an embodiment of the present disclosure.

Suppose that bi-directional motion vectors MV0 and MV1 pointing to corresponding regions (i.e., reference blocks) most similar to the to-be-encoded target block in the current picture have been determined in the reference pictures $Ref_0$ and $Ref_1$ by (normal) bi-directional motion prediction for the target block. The two motion vectors have values representing the motion of the entire target block.

In the example of FIG. 6, $P_0$ is a sample in the reference picture $Ref_0$ indicated by the motion vector $MV_0$ and corresponding to sample P in the target block, and $P_1$ is a sample in the reference picture $Ref_1$ indicated by the motion vector $MV_1$ and corresponding to sample P in the target block. Further, suppose that motion for sample P in FIG. 6 is slightly different from the overall motion of the target block. For example, when an object located at sample A in $Ref_0$ of FIG. 6 moves to sample B in $Ref_1$ via sample P in the target block of the current picture, sample A and sample B may have values quite similar to each other. Accordingly, in this case, a point in $Ref_0$ most similar to sample P in the target block is not $P_0$ indicated by the motion vector $MV_0$, but sample A which has been shifted from $P_0$ by a predetermined displacement vector $(v_x t_0, v_y t_1)$. A point in $Ref_1$ most similar to sample P in the target block is not $P_1$ indicated by the motion vector $MV_1$, but sample B which has been shifted from $P_1$ by a predetermined displacement vector $(-v_x t_0, -v_y t_1)$. In particular, $t_0$ and $t_1$ denote time-axis distances of $Ref_0$ and $Ref_1$ with respect to the current picture, respectively, and are calculated based on picture order count (POC). Hereinafter, $(v_x, v_y)$ is referred to as an "optical flow."

In predicting the value of sample P of the current block in the current picture, two reference samples A and B enables more accurate prediction than reference samples $P_0$ and $P_1$ indicated by the bi-directional motion vectors $MV_0$ and $MV_1$. $I^{(0)}(i,j)$ denotes a value of a sample in the reference picture $Ref_0$ indicated by the motion vector $MV_0$ as corresponding to the sample $(i, j)$ in the target block, and $I^{(1)}(i,j)$ denotes a value of a sample in the reference picture $Ref_1$ indicated by the motion vector $MV_1$ as corresponding to the sample $(i,j)$ in the target block.

The value of sample A in the reference picture $Ref_0$ indicated by a BDOF motion vector $(v_x, v_y)$ as corresponding to the sample in the target block may be defined as $I^{(0)}(i+v_x t_0, j+v_y t_0)$, and the value of sample B in the reference picture $Ref_1$ may be defined as $I^{(1)}(i-v_x t_1, j-v_y t_1)$. In particular, when linear approximation is performed using only the first-order term of the Taylor series, A and B may be expressed as Equation 1.

$$A = I^{(0)}(i + v_x \tau_0, j + v_y \tau_0)$$
$$\approx I^{(0)}(i, j) + v_x \tau_0 I_x^{(0)}(i, j) + v_y \tau_0 I_y^{(0)}(i, j)$$
$$B = I^{(1)}(i - v_x \tau_1, j - v_y \tau_1)$$
$$\approx I^{(1)}(i, j) - v_x \tau_1 I_x^{(1)}(i, j) - v_y \tau_1 I_y^{(1)}(i, j)$$

Equation 1 wherein, $I_x^{(k)}$ and $I_y^{(k)}$ (k=0, 1) are gradient values in the horizontal and vertical directions at position $(i, j)$ of $Ref_0$ and $Ref_1$. As described above, $t_0$ and $t_1$ denote time-axis distances of $Ref_0$ and $Ref_1$ with respect to the current picture, respectively, and are represented as $t_0$=POC(current)−POC($Ref_0$) and $t_1$=POC($Ref_1$)−POC(current), based on POC.

The bi-directional optical flow $(v_x, v_y)$ of each sample in a block is determined as a solution that minimizes Δ, which is defined as a difference between sample A and sample B. Δ may be defined by Equation 2 using the linear approximation of A and B derived from Equation 1.

$$\Delta = A - B$$
$$= \left(I^{(0)} - I^{(1)}\right) + v_x\left(\tau_0 I_x^{(0)} + \tau_1 I_x^{(1)}\right) + v_y\left(\tau_0 I_y^{(0)} + \tau_1 I_y^{(1)}\right)$$

Equation 2

For simplicity, the sample position $(i, j)$ is omitted from each term of Equation 2.

To implement more robust optical flow estimation, it is assumed that the motion is locally consistent with neighboring samples. the BDOF motion vector for a sample $(i, j)$ that is currently to be predicted is calculated considering the differences Δ in Equation 2 for all samples (i', j') present in a mask Ω of a certain size centered on the sample (i, j). As shown in Equation 3, the optical flow for the current sample (i, j) may be determined as a vector that minimizes the sum of squares of the differences Δ[i', j'] obtained for the respective samples in the mask Ω, as shown in Equation 3.

$$\Phi(v_x, v_y) = \sum_{[i',j']\in\Omega} \Delta^2[i', j'] \qquad \text{Equation 3}$$

The bi-directional optical flow of the present embodiment may be applied in the case where one of two reference pictures used for bi-directional prediction precedes the current picture in display order, the other one follows the current picture, and the distances from the two reference pictures to the current picture are equal to each other, that is, the differences in picture order count (POC) between each reference picture and the current picture are equal to each other. Therefore, $t_0$ and $t_1$ may be excluded.

In addition, the bi-directional optical flow of the present embodiment may be applied only to luma components. The bi-directional optical flow of the present embodiment is performed on a subblock basis, not pixel basis, for the target block to which bi-directional prediction is applied. In the following description, the subblock, which may have various sizes of 2×2, 4×4, and 8×8, is assumed to have a size of 4×4 for simplicity.

Before performing the optical flow, the inter-predictor 124 of the video encoding apparatus is configured to generate two reference blocks for the target block using the forementioned bi-directional prediction. The first reference block of the two reference blocks represents a block composed of predicted samples generated from the reference picture $\text{Ref}_0$ using the first motion vector $MV_0$ of the target block, and the second reference block represents a block composed of predicted samples generated from the reference picture $\text{Ref}_1$ using the motion vector $MV_1$.

The inter-predictor 124 is configured to calculate an optical flow $(v_x, v_y)$ for each of 4×4 subblocks constituting the target block, using horizontal and vertical gradient values of predicted samples in the first reference block and the second reference block. The optical flow $(v_x, v_y)$ is determined such that the difference between the predicted samples from the reference picture $\text{Ref}_0$ and the predicted samples from the reference picture $\text{Ref}_1$ is minimized. The inter-predictor 124 is configured to derive a sample offset for modifying bi-directional predicted samples for the 4×4 subblock, by using $(v_x, v_y)$ calculated for the 4×4 subblock and gradients of the predicted samples in the 4×4 subblock.

As shown in Equation 4, the inter-predictor 124 is configured to calculate the horizontal and vertical gradients of sample values at position (i, j).

$$\frac{\partial I^{(k)}}{\partial x}(i, j) = \left(I^{(k)}(i+1, j) - I^{(k)}(i-1, j)\right) \gg \text{shift1} \qquad \text{Equation 4}$$

$$\frac{\partial I^{(k)}}{\partial y}(i, j) = \left(I^{(k)}(i, j+1) - I^{(k)}(i, j-1)\right) \gg \text{shift1}$$

wherein, k is 0 or 1, and $I^{(0)}(i,j)$ and $I^{(1)}(i,j)$ denote sample values at position (i,j) in the first reference block and the second reference block, respectively. Additionally, shift1 is a value derived from bit-depth for a luma component, for example shift1=max(6, bitDepth-6).

To derive a gradient of a sample located at the boundary of each reference block, samples outside the boundary of the first reference block and the second reference block are needed. Accordingly, as shown in FIG. 6, each reference block is extended by one column to the left and right and by one row to the upper side and lower side. To reduce the amount of computation, each sample in the extended portion may be padded with a sample or integer sample at the nearest position in the reference block. Additionally, gradients at a sample position outside the boundary of each reference block may be padded with gradients corresponding to samples at the nearest position.

Figure 7:
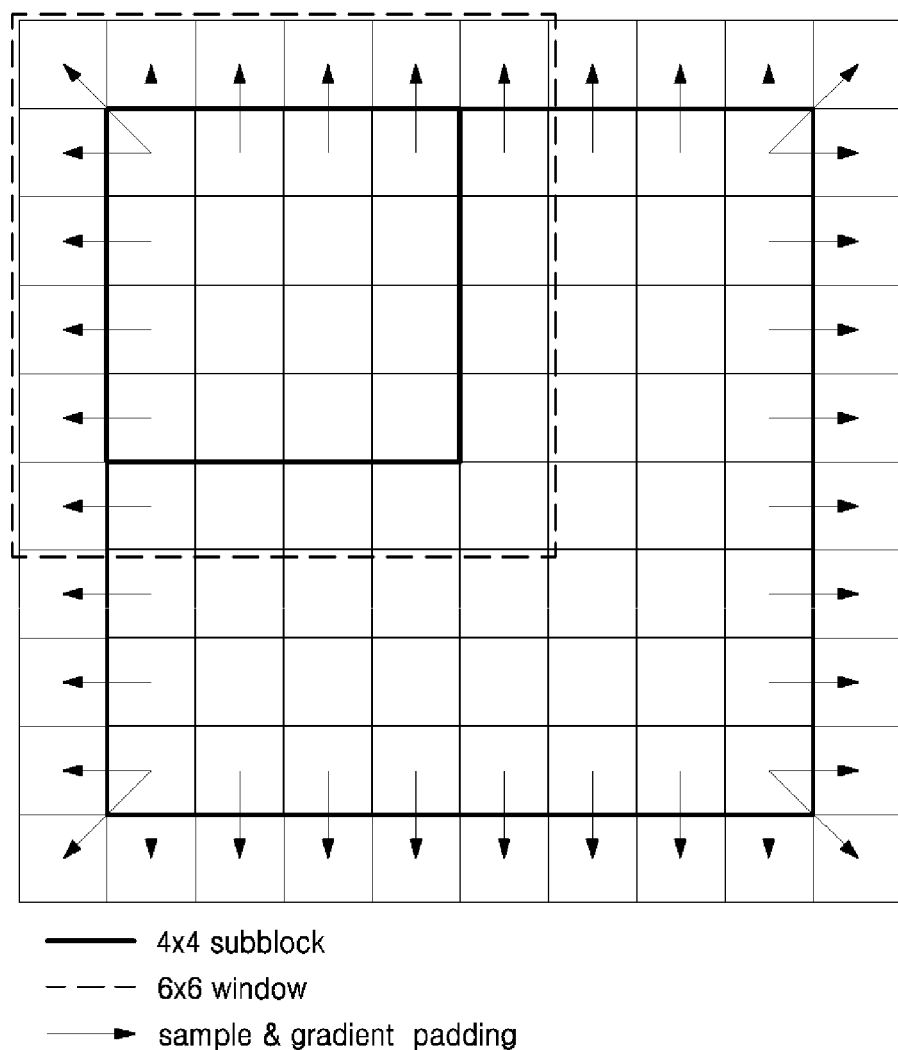
FIG. 7 is an exemplary diagram illustrating a method for deriving a gradient for a block boundary sample in a bi-directional optical flow.

The inter-predictor 124 is configured to calculate S1, S2, S3, S5, and S6 corresponding to auto-correlation and cross-correlation of gradients as shown in Equation 5, using the horizontal and vertical gradients in a 6×6 window covering a 4×4 subblock as shown in FIG. 7.

$$S_1 = \sum_{(i,j)\in\Omega} \psi_x(i, j) \cdot \psi_x(i, j), \qquad \text{Equation 5}$$

$$S_3 = \sum_{(i,j)\in\Omega} \theta(i, j) \cdot \psi_x(i, j)$$

$$S_2 = \sum_{(i,j)\in\Omega} \psi_x(i, j) \cdot \psi_y(i, j)$$

$$S_5 = \sum_{(i,j)\in\Omega} \psi_y(i, j) \cdot \psi_y(i, j)$$

$$S_6 = \sum_{(i,j)\in\Omega} \theta(i, j) \cdot \psi_y(i, j)$$

As described above, Ω denotes a mask of a certain size. In addition, as shown in Equation 6 below, $\Psi_x(i,j)$ denotes the sum of the horizontal gradient values at position (i,j) in the first reference block and the second reference block, $\Psi_y(i,j)$ denotes the sum of the vertical gradient values at position (i,j) position in the first reference block and the second reference block, and θ(i,j) denotes a difference between the sample value at position (i,j) in the second reference block and the sample value at position (i,j) in the first reference block.

$$\psi_x(i, j) = \left(\frac{\partial I^{(1)}}{\partial x}(i, j) + \frac{\partial I^{(0)}}{\partial x}(i, j)\right) \gg n_a \qquad \text{Equation 6}$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

wherein, $n_a$ and $n_b$ are values derived from the bit-depth, and have values of min(1, bitDepth-11) and min(4, bitDepth-8).

The inter-predictor 124 is configured to calculate the optical flows $(v_x, v_y)$ for the 4×4 subblock based on S1, S2, S3, S5, and S6, as shown in Equation 7.

$$v_x = \qquad \text{Equation 7}$$

$$S_1 > 0 ? \text{clip}3(-th'_{BIO}, th'_{BIO}, -((S_3 \cdot 2^{n_b-n_a}) \gg \lfloor \log_2 S_1 \rfloor)) : 0$$

-continued $v_y = S_5 > 0?$ clip 3

$(-th'_{BIO}, th'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)) : 0$ wherein, $S_{2,m} = S_2 \gg n_{S_2}$, $S_{2,s} = S_2 \& (2^{n_{S_2}} - 1)$, and $th'_{BIO} = 2^{max(5, BD-7)}$.

$\lfloor \cdot \rfloor$ is a floor function, and $n_{S_2} = 12$.

The sample offset for modifying the predicted sample at each sample position (x, y) in the 4×4 subblock in the target block may be calculated using the optical flow calculated for the 4×4 subblock and gradient values at the sample position (x, y), as shown in Equation 8.

$$b(x, y) = rnd\left(\left(v_x\left(\frac{\partial I^{(1)}(x, y)}{\partial x} - \frac{\partial I^{(0)}(x, y)}{\partial x}\right)\bigg/2\right)\right) + rnd\left(v_y\left(\frac{\partial I^{(1)}(x, y)}{\partial x} - \frac{\partial I^{(0)}(x, y)}{\partial x}\right)\bigg/2\right)\right) \quad \text{Equation 8}$$

wherein, rnd( ) denotes a round-off operation.

The inter-predictor 124 is configured to generate a final predicted sample pred(x, y) using the sample offset b(x, y) at position (x, y), and predicted samples $I^{(0)}(x,y)$ and $I^{(1)}(x, y)$ in the first reference block and the second reference block, as shown in Equation 9.

$$pred(x,y)=(I^{(0)}(x,y)+I^{(1)}(x,y)+b(x,y)+o_{offset})\gg shift$$

wherein, shift is Max(3, 15-bitDepth), and $O_{offset}$ is a value for a rounding-off operation and is half the shift.

As described above, the bi-directional optical flow technique uses values of samples predicted using motion information (two motion vectors and two reference pictures) used for bi-directional prediction. Therefore, the inter-predictor 544 of the video decoding apparatus may also perform the bi-directional optical flow in the same manner as the video encoding apparatus, using the motion information (motion vectors, reference pictures) for bi-directional prediction received from the video encoding apparatus. Accordingly, it is not required that the video encoding apparatus signals additional information for the bi-directional optical flow process to the video decoding apparatus.

II. Affine Motion Prediction

The inter-prediction described above is motion prediction reflecting a translation motion model. In other words, it is a technique for predicting motion in the horizontal direction (x-axis direction) and the vertical direction (y-axis direction). However, in practice, there may be various types of motions such as rotation, zoom-in, or zoom-out in addition to the translational motion. One aspect of the present embodiment provides affine motion prediction capable of reflecting such various types of motions.

Figure 8A:
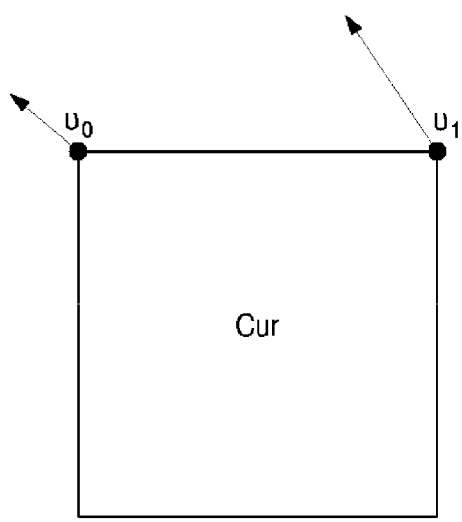
FIGS. 8A-8B are exemplary diagrams illustrating affine motion prediction according to an embodiment of the present disclosure.
Figure 8B:
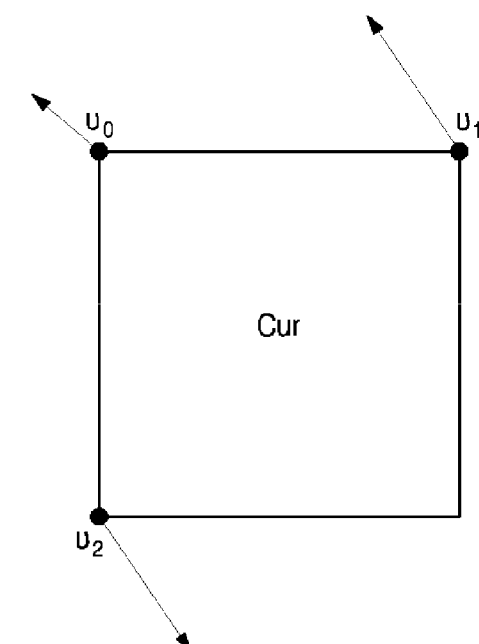

FIGS. 8A-8B are exemplary diagrams illustrating affine motion prediction according to an embodiment of the present disclosure.

There may be two types of models for affine motion prediction. One is a model using the motion vectors of two control points of the top-left corner and top-right corner of a target block to be currently encoded, that is, four parameters, as shown in FIG. 8A. The other model is a model using the motion vectors of three control points of the top-left corner, top-right corner and bottom-left corner of the target block, that is, six parameters, as shown in FIG. 8B.

The four-parameter affine model is expressed as shown in Equation 10. The motion at the sample position (x, y) in the target block may be calculated according to Equation 10. The position of the above left sample of the target block is assumed to be (0, 0).

$$\begin{cases} mv_x = \frac{mv_{1x} - mv_{0x}}{W}x - \frac{mv_{1y} - mv_{0y}}{W}y + mv_{0x} \\ mv_y = \frac{mv_{1y} - mv_{0y}}{W}x + \frac{mv_{1x} - mv_{0x}}{W}y + mv_{0y} \end{cases} \quad \text{Equation 10}$$

The six-parameter affine model is expressed by Equation 11. The motion at the sample position (x, y) in the target block may be calculated according to Equation 11.

$$\begin{cases} mv_x = \frac{mv_{1x} - mv_{0x}}{W}x + \frac{mv_{2x} - mv_{0x}}{W}y + mv_{0x} \\ mv_y = \frac{mv_{1y} - mv_{0y}}{W}x + \frac{mv_{2y} - mv_{0y}}{W}y + mv_{0y} \end{cases} \quad \text{Equation 11}$$

wherein, $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point. Additionally, W is the horizontal length of the target block, and H is the vertical length of the target block.

Figure 9:
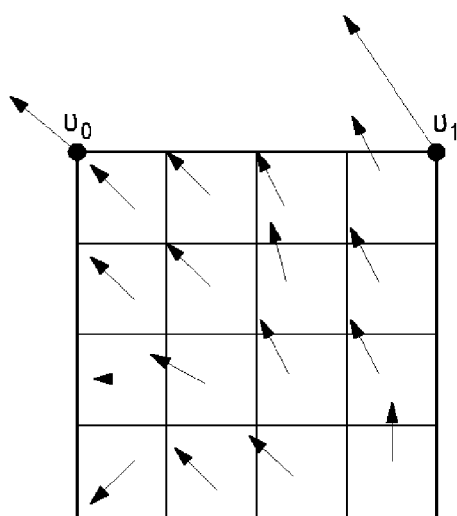
FIG. 9 is an exemplary diagram illustrating subblock-by-subblock affine motion prediction according to an embodiment of the present disclosure

The affine motion prediction may be performed for each sample in the target block using a motion vector calculated according to Equation 10 or 11. Alternatively, to reduce the computational complexity, the prediction may be performed for each subblock split from the target block as illustrated in FIG. 9. For example, the size of the subblock may be 4×4, 2×2, or 8×8. In an exemplary embodiment below, the affine motion prediction for the target block is performed on a 4×4 subblock basis. This example is for convenience of explanation only and the present disclosure is not limited thereto.

In the subblock-based affine motion prediction, the motion vector (affine motion vector) of each subblock is calculated by substituting the center position of each subblock in (x, y) of Equation 10 or 11. In particular, the center position may be an actual center point of the subblock or the bottom-right sample position of the center point. For example, in the case of a 4×4 subblock in which the coordinates of the bottom-left sample are (0, 0), the center position of the subblock may be (1.5, 1.5) or (2, 2). The predicted block for each subblock is generated using the affine motion vector $(mv_x, mv_y)$ of the subblock. The motion vectors $(mv_x, mv_y)$ may be set to have 1/16 sample precision. In particular, the motion vector $(mv_x, mv_y)$ calculated according to Equation 1 or 2 may be rounded in 1/16 sample units.

The affine motion prediction may be performed not only for the luma component but also for the chroma component. In the case of a 4:2:0 video format, when affine motion prediction for the luma component is performed on a 4×4 subblock basis, affine motion prediction for the chroma component may be performed on a 2×2 subblock basis. The motion vector $(mv_x, mv_y)$ of each subblock of the chroma component may be derived from the motion vector of the corresponding luma component. Alternatively, the size of the subblock for affine motion prediction of the chroma component may be the same as that for the luma component.

When affine motion prediction for the luma component is performed on a 4×4 subblock basis, affine motion prediction for the chroma component is also performed on the 4×4 subblock basis. In particular, since the 4×4 subblock for the chroma component corresponds to four 4×4 subblocks for the luma component, the motion vector ($mv_x$, $mv_y$) for the subblock of the chroma component may be calculated by calculating the average of the motion vectors of the four corresponding subblocks of the luma component.

The video encoding apparatus is configured to perform intra-prediction, inter-prediction (translational motion prediction), affine motion prediction, and the like, and calculates a rate-distortion (RD) cost to select an optimal prediction method. To perform affine motion prediction, the inter-predictor 124 of the video encoding apparatus determines which of the two types of models to use, and determines two or three control points according to the determined type. The inter-predictor 124 is configured to calculate the motion vector ($mv_x$, $mv_y$) for each of 4×4 subblocks in the target block using the motion vectors of the control points. Then, the inter-predictor 124 is configured to perform motion compensation in a reference picture on a subblock-by-subblock basis using the motion vector ($mv_x$, $mv_y$) of each subblock to generate a predicted block for each subblock in the target block.

The entropy encoder 155 of the video encoding apparatus is configured to encode affine related syntax elements including a flag indicating whether affine motion prediction is applied to the target block, type information indicating a type of the affine model, and motion information indicating a motion vector of each control point, and transmit the same to the video decoding apparatus. The type information and the motion information about the control points may be signaled when affine motion prediction is performed, and as many motion vectors of the control points as a number determined according to the type information may be signaled.

The video decoding apparatus is configured to determine the type of the affine model and the control point motion vectors using the signaled syntax elements, and calculate the motion vector ($mv_x$, $mv_y$) for each 4×4 subblock in the target block using Equation 10 or 11. When the motion vector resolution information about the affine motion vector of the target block is signaled, the motion vector ($mv_x$, $mv_y$) is corrected to a precision identified by the motion vector resolution information through operations such as rounding-off.

The video decoding apparatus is configured to generate a predicted block for each subblock by performing motion compensation within a reference picture using the motion vector ($mv_x$, $mv_y$) for each subblock. To reduce the amount in bits required to encode the motion vectors of control points, a method as used in the above-described normal inter-prediction (translation motion prediction) may be applied.

As an example, in the merge mode, the inter-predictor 124 of the video encoding apparatus is configured to derive a motion vector of each control point from neighboring blocks of the target block. For example, the inter-predictor 124 is configured to generate a merge candidate list by deriving a predefined number of merge candidates from neighboring samples L, BL, A, AR, and AL of the target block illustrated in FIG. 4. Each of the merge candidates included in the list corresponds to a pair of motion vectors of two or three control points.

First, the inter-predictor 124 is configured to derive a merge candidate from the control point motion vectors of the neighboring blocks predicted in the affine mode among the neighboring blocks. In some embodiments, the number of merge candidates derived from neighboring blocks predicted in the affine mode may be limited. For example, the inter-predictor 124 may be configured to derive two merge candidates from the neighboring blocks predicted in the affine mode: one of L and BL and one of A, AR, and AL. The priority may be assigned in order of L and BL and in order of A, AR and AL. When the total number of merge candidates is greater than or equal to 3, the inter-predictor 124 may be configured to derive a necessary number of merge candidates from the translational motion vectors of the neighboring blocks.

Figure 10:
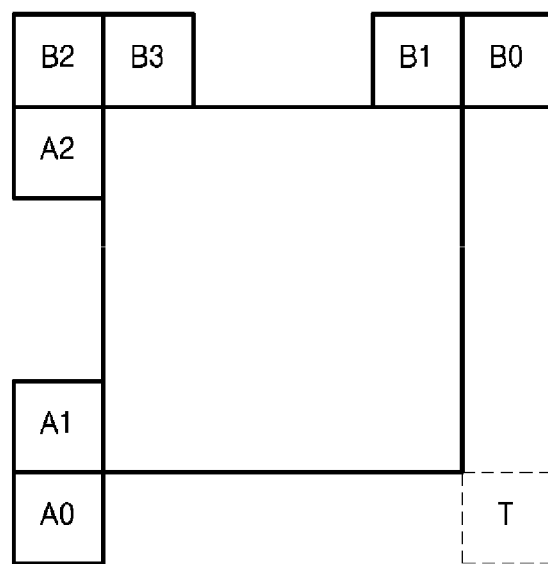
FIG. 10 is an exemplary diagram illustrating a method for deriving merge candidates for affine motion prediction from translation motion vectors of neighboring blocks.

FIG. 10 is an exemplary diagram illustrating a method of deriving merge candidates for affine motion prediction from translation motion vectors of neighboring blocks. The inter-predictor 124 is configured to derive control point motion vectors CPMV1, CPMV2, CPMV3 from a neighboring block group {B2, B3, A2}, a neighboring block group {B1, B0}, and a neighboring block group {A1, A0}, respectively. As an example, the priorities in each neighboring block group may be assigned in order of B2, B3, A2, order of B1 and B0, and order of A1 and A0. In addition, another control point motion vector CPMV4 is derived from a collocated block T in the reference picture. The inter-predictor 124 is configured to generate as many merge candidates as necessary through combinations of two or three control point motion vectors among the four control point motion vectors. The priorities of the combinations are assigned as shown below. The elements in each group are listed in order of the top-left corner, top-right corner, and bottom-left corner control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}

The inter-predictor 124 is configured to select a merge candidate in the merge candidate list and perform affine motion prediction on the target block. When the selected candidate consists of two control point motion vectors, affine motion prediction is performed using a four-parameter model. On the other hand, when the selected candidate consists of three control point motion vectors, affine motion prediction is performed using a six-parameter model. The entropy encoder 155 of the video encoding apparatus encodes index information indicating the selected merge candidate among the merge candidates in the merge candidate list and signals the same to the video decoding apparatus.

The entropy decoder 510 of the video decoding apparatus decodes the index information signaled from the video encoding apparatus. The inter-predictor 544 of the video decoding apparatus constructs a merge candidate list in the same manner as the video encoding apparatus, and is configured to perform affine motion prediction using control point motion vectors corresponding to the merge candidate indicated by the index information.

As another example, in the AMVP mode, the inter-predictor 124 of the video encoding apparatus is configured to determine the type of the affine model and control point motion vectors for the target block. Then, the inter-predictor 124 is configured to determine motion vector differences, which are differences between the actual control point motion vectors of the target block and the predicted motion vectors of the respective control points, and transmit the motion vector differences which respectively correspond to the control points. Accordingly, the inter-predictor 124 of the video encoding apparatus configures a list of a predefined number of affine AMVPs. When the target block is of a 4-parameter type, the candidates included in the list are each composed of a pair of two control point motion vectors. On the other hand, when the target block is of a 6-parameter type, the candidates included in the list are each composed of a pair of three control point motion vectors. The affine AMVP list may be derived using control point motion vectors or translational motion vectors of neighboring blocks in a manner similar to the method of constructing a merge candidate list described above.

However, to derive candidates to be included in the affine AMVP list, there may be a restriction of considering only neighboring blocks that refer to the same reference picture as the target block among the neighboring blocks of FIG. 4.

In addition, in the AMVP mode, the affine model type of the target block should be considered. When the affine model type of the target block is a 4-parameter type, the video encoding apparatus derives two control point motion vectors (top-left corner and top-right corner control point motion vectors of the target block) using the affine model of a neighboring block. When the affine model type of the target block is a 6-parameter type, the apparatus derives three control point motion vectors (top-left corner, top-right corner and bottom-left control point motion vectors of the target block) using the affine model of a neighboring block.

When the neighboring block is of the 4-parameter type, two or three control point motion vectors are predicted according to the affine model type of the target block using two control point motion vectors of the neighboring block. For example, an affine model of a neighboring block expressed by Equation 10 may be used. In Equation 10, $(mv_{0x}, mv_{0y})$ and $(mv_{1x}, mv_{1y})$ are replaced by the top-left corner and top-right corner control point motion vectors of the neighboring block, respectively. Additionally, W is replaced by the horizontal length of the neighboring block. The predicted motion vector for each control point of the target block may be derived by inputting, into (x, y), the difference between the position of the corresponding control point of the target block and the position of the top-left corner of the neighboring block.

When the neighboring block is of the 6-parameter type, two or three control point motion vectors are predicted according to the affine model type of the target block using three control point motion vectors of the neighboring block. For example, an affine model of a neighboring block expressed by Equation 11 may be used. In Equation 11, $(mv_{0x}, mv_{0y})$, $(mv_{1x}, mv_{1y})$, and $(mv_{2x}, mv_{2y})$ are replaced by control point motion vectors of the top-left corner, top-right corner and bottom-left corner of the neighboring block, respectively. The predicted motion vector for each control point of the target block may be derived by inputting, into (x, y), the difference between the position of the corresponding control point of the target block and the position of the top-left corner of the neighboring block.

The inter-predictor 124 of the video encoding apparatus is configured to select one candidate in the affine AMVP list, and generate motion vector differences between the motion vector of each actual control point and the predicted motion vector of the corresponding control point of the selected candidate. The entropy encoder 155 of the video encoding apparatus is configured to encode type information indicating the affine model type of the target block, index information indicating a selected candidate among the candidates in the affine AMVP list, and a motion vector difference corresponding to each control point and transmits the same to the video decoding apparatus.

The inter-predictor 544 of the video decoding apparatus is configured to determine the affine model type using the information signaled from the video encoding apparatus, and generate a motion vector difference of each control point. Then, the inter-predictor is configured to generate an affine AMVP list in the same manner as the video encoding apparatus, and select a candidate indicated by the index information signaled in the affine AMVP list. The inter-predictor 544 of the video decoding apparatus is configured to calculate a motion vector of each control point by adding the predicted motion vector of each control point of the selected candidate and a corresponding motion vector difference.

III. Sample-by-Sample Adjustment of Affine Motion Prediction Samples

Subblock-by-subblock affine motion prediction for a target block has been described above. Another aspect of the present disclosure relates to adjusting, on a sample-by-sample basis, sample values of predicted samples generated by subblock-by-subblock affine motion prediction. The motion according to the position of each sample is additionally compensated in each subblock that forms the basis of affine motion prediction.

When the sample values in any one subblock generated as a result of subblock-by-subblock affine motion prediction for a target block are I(x, y), the video encoding apparatus calculates the horizontal and vertical gradients $g_x(i, j)$ and $g_y(i, j)$ at each sample position. Equation 12 may be used to calculate the gradients.

$$g_x(i,j)=I(i+1,j)-I(i-1,j)$$

$$g_y(i,j)=I(i,j+1)-I(i,j-1) \tag{12}$$

The sample offset $\Delta I(i, j)$ for adjusting the prediction sample is calculated by the following equation.

$$\Delta I(i,j)=g_x(i,j)*\Delta mv_x(i,j)+g_y(i,j)*\Delta mv_y(i,j) \tag{13}$$

wherein, $\Delta mv(i,j)$ denotes a motion offset, that is, a difference between the affine motion vector in the sample (i, j) and the affine motion vector at the center position of the subblock, and may be calculated by applying Equation 10 or 11 depending on the affine model type of the target block. In other words, $\Delta mv(i, j)$ may be calculated from Equation 10 or 11 by subtracting the motion vector given when the subblock center position is input to (x, y) from the motion vector given when (i, j) is input to (x, y). Additionally, $\Delta mv(i, j)$ may be calculated from Equations 11 and 12 except for the last term "$+mv_{0x}$" and "$+mv_{0y}$" by substituting (x, y) in Equations 11 and 12 with the horizontal and vertical offsets from the subblock center position to the sample position (i,j). The center position may be the actual center point of the subblock, or may be the bottom-right sample position of the center point.

The motion vector of each control point of the target block used for calculation of $\Delta mv(i, j)$ and the difference between the sample position (i, j) and the center position of the subblock are the same for all subblocks. Accordingly, the values of $\Delta mv(i, j)$ may be calculated for only one subblock, for example, a first subblock, and may be reused for the other subblocks.

The technique of the present disclosure is based on the assumption that the object moves at a constant speed and the change in sample values is smooth. Therefore, sample variations in the horizontal direction and the amount of sample change in the vertical direction are obtained by multiplying the x component ($\Delta mv_x$) and y component ($\Delta mv_y$) of $\Delta mv(i, j)$ by the horizontal and vertical sample gradient values, respectively. The sample offset ΔI(i,j) is calculated by adding the two sample variations. The final value of the predicted sample is calculated as follows.

$$I'(i,j)=I(i,j)+\Delta I(i,j) \quad (14)$$

When sample-by-sample adjustment for affine motion prediction samples is applied, the inter-predictor 124 of the video encoding apparatus and the inter-predictor 544 of the video decoding apparatus perform the above-described process to modifying the sample values of the predicted samples generated through the affine motion prediction. Gradient values are derived from the predicted samples generated through the affine motion prediction, and Δmv(i, j) is derived from the control point motion vectors of the target block. Therefore, it is not required that the video encoding apparatus signals additional information for the present technique to the video decoding apparatus.

IV. Motion Vector Refinement

As described above, in the case of inter-prediction using bi-directional prediction, a reference picture $Ref_0$ selected from a reference picture list L0, a motion vector $MV_0$ referring to the reference picture $Ref_0$, a reference pictures $Ref_1$ selected from a reference picture list L1, and a motion vector $MV_1$ referring to the reference picture $Ref_1$ are determined. The motion vector refinement described in this embodiment is a coding tool to improve the accuracy of inter-prediction by finely adjusting the two motion vectors $MV_0$ and $MV_1$ for bi-directional prediction. The motion vector refinement may be applied to a merge mode in which a motion vector of a neighboring block is used as a motion vector of a target block. Alternatively, it may be applied to an AMVP mode (normal inter-prediction) or an affine mode.

Figure 11:
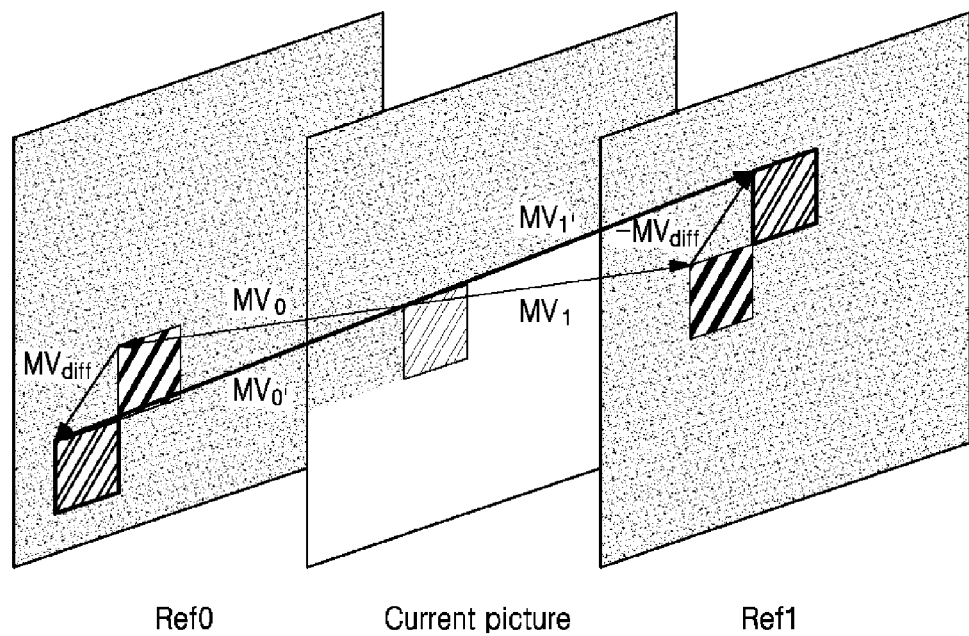
FIG. 11 is an exemplary diagram illustrating the concept of a motion vector refinement coding tool according to an embodiment of the present disclosure.

FIG. 11 is an exemplary diagram illustrating the concept of a motion vector refinement coding tool according to an embodiment of the present disclosure. In bi-directional prediction, the inter-predictor 124 of the video encoding apparatus is configured to search for a refined motion vector around the initial motion vectors for the reference picture $Ref_0$ and the reference picture $Ref_1$. In particular, the initial motion vectors represent the two motion vectors $MV_0$ and $MV_1$ for bi-directional prediction. Distortion between two candidate blocks in the reference pictures $Ref_0$ and $Ref_1$ is calculated using block matching. As shown in FIG. 11, in the reference pictures $Ref_0$ and $Ref_1$, a sum of absolute difference (SAD) between two candidate blocks at the positions determined by the respective initial motion vectors and between the two candidate blocks around the positions is calculated.

In other words, the sum of the absolute values of the difference between the sample values corresponding to each other in both candidate blocks is calculated. The inter-predictor 124 is configured to select a motion vector candidate having the minimum SAD as a refined motion vector and uses the same to generate a bi-directional prediction signal according to inter-prediction. While the SAD is used to represent the difference between the two candidate blocks, embodiments are not limited thereto. Any metric capable of expressing the difference between the two candidate blocks, such as the sum of squared error (SSE) may be used.

Motion vector refinement may be applied when one reference picture precedes the current picture in display order, the other reference picture follows the current picture, and the distances from the two reference pictures to the current picture are the same, that is, the reference pictures have the same difference in picture order count (POC) from the current picture. As shown in FIG. 11, for two initial motion vectors $MV_0$ and $MV_1$ in the two reference pictures $Ref_0$ and $Ref_1$, refined bi-directional motion vector candidates $MV_0'$ and $MV_1'$ in the respective reference picture lists can be expressed as in Equation 15.

$$MV_0'=MV_0+MV\_offset$$

$$MV_1'=MV_1-MV\_offset \quad (15)$$

wherein, MV_offset is an offset for the initial motion vectors according to motion vector refinement, and represents a difference between a motion vector candidate and a corresponding initial motion vector. This offset may be a sum of an integer offset in units of integer samples and a subpixel offset in units of sub-pixel or sub-pel samples. As shown in Equation 15, candidates for the two motion vectors conform to a mirroring rule for the MV difference. The process of searching for an optimal offset for a refined motion vector includes two operations: an integer sample search for searching for an integer offset, and a fractional sample refinement for searching for a sub-pixel offset.

Figure 12:
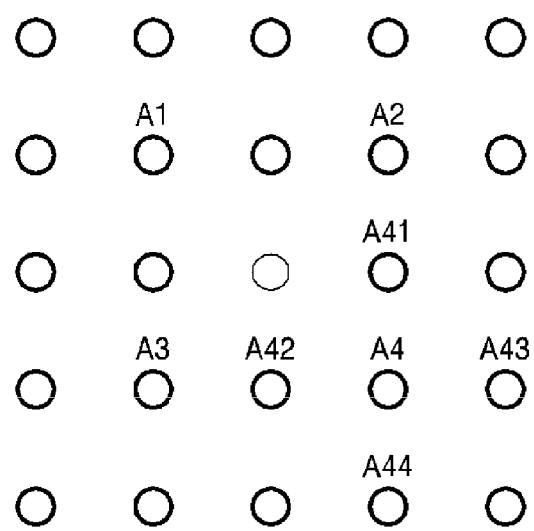
FIG. 12 is an exemplary diagram illustrating a method for reducing search complexity for the motion vector refinement coding tool according to an embodiment of the present disclosure.

First, in the integer sample search operation, the inter-predictor 124 is configured to search for all 25 neighboring points, including the center of refinement as shown in FIG. 12. In particular, the center of the refinement corresponds to the position indicated by the initial motion vector. When the SAD between a pair of two candidate blocks at the two positions determined according to the initial motion vectors is less than a specific threshold, the operation after the integer sample search may be skipped. By calculating the SAD between the two candidate blocks corresponding to the neighboring points of the positions indicated by the initial motion vectors, the inter-predictor 124 is configured to search for a point having the minimum SAD, that is, minSAD. According to the result of the integer sample search, the integer offset for the motion vector candidate having minSAD is expressed as (intOffX, intOffY).

After the integer sample search operation is completed, when intOffX of the integer offsets is not −2 or 2 and intOffY is not −2 or 2 {(intOffX !=(2∥−2)) && (intOffY !=(2∥−2))}, the inter-predictor 124 sets subPelFlag, which is an indication flag for applying the fractional sample refinement operation, to a value of 'true'. When subPelFlag is set to 'true', the inter-predictor 124 performs the fractional sample refinement operation. The inter-predictor 124 is configured to generate an optimal sub-pixel offset by solving a parametric error surface equation in a two-dimensional space as shown in Equation 16.

$$E(x,y)=A(x-x_{min})^2+B(y-y_{min})^2+C \quad (16)$$

wherein, E(x,y) is a cost at position (x,y) and may be defined as an SAD between two candidate blocks corresponding to position (x,y). Additionally, $(x_{min}, y_{min})$ is a sample position with a minimum cost C and represents an optimal sub-pixel offset.

On the assumption that the sample position corresponding to the integer offset according to the integer sample search is (0,0), an optimal sub-pixel offset may be calculated with the cost of blocks corresponding to all four positions (top, bottom, left and right positions), (−1,0), (1,0), (0,1), and (0,1), as shown in Equation 17.

$$x_{min}=(E(-1,0)-E(1,0))/(2(E(-1,0)+E(1,0)-2E(0,0)))$$

$$y_{min}=(E(0,-1)-E(0,1))/(2(E(0,-1)+E(0,1)-2E(0,0))) \quad (17)$$

The constraint on the cost E(x,y) may be expressed by Equation 18.

$$E(x,y)\geq 0 \; \&\& \; E(0,0) \text{ is minimum} \quad (18)$$

Based on Equation 18, '−0.5<$x_{min}$, $y_{min}$<0.5' is satisfied.

The inter-predictor 124 may be configured to generate an optimal offset in a sub-pixel unit by adding the sub-pixel offset and the integer offset, and then add the optimal offset to the initial motion vectors using Equation 15 to obtain refined bi-directional motion vectors. In addition, the inter-predictor 124 may be configured to generate inter-predicted samples for the target block using the refined bi-directional motion vectors and the bi-directional reference pictures.

As described above, in the motion vector refinement process, motion vectors are refined using motion information (two motion vectors and two reference pictures) used for bi-directional prediction. Accordingly, the inter-predictor 544 of the video decoding apparatus may also be configured to perform motion vector refinement in the same manner as the video encoding apparatus using the motion information (motion vectors and reference pictures) used for bi-directional prediction and received from the video encoding apparatus. Therefore, signaling of additional information for the motion vector refinement process from the video encoding apparatus to the video decoding apparatus is not required.

When the motion vector refinement process is applied, various complexity issues may be raised in particular at the decoder side because SAD values for candidate blocks must be calculated for every target block. When the fractional sample refinement operation is performed for motion vectors based on a sample corresponding to an integer offset, a complex equation as shown in Equation 16 needs to be solved. This process may be difficult to optimize with hardware. When the merge mode is suitable for the inter-prediction, the need for the fractional sample refinement operation may be relatively low in motion vector refinement. Accordingly, the motion vector refinement process for each of blocks encoded in the merge mode increases the complexity of the video encoding/decoding apparatus and makes it difficult to expect corresponding compression efficiency.

In view of the above, the present disclosure provides a method for reducing the complexity of the video encoding/decoding apparatus by determining the need for adjustment of motion vectors on a sub-pixel basis using the integer offset information acquired in the integer sample search operation and skipping the fractional sample refinement operation according to the result of the determination. In the motion vector refinement process described above, when the SAD of the initial motion vector pairs is greater than or equal to a specific threshold, the integer sample search and fractional sample refinement operations are performed. The threshold is determined according to the size of the target block. For example, it may be set as the value of sbHeight× sbWidth, that is, the area of the target block.

In another example according to the present embodiment, the threshold may be determined based on a quantization parameter as well as the area of the target block. In another example, whether to perform the integer sample search and fractional sample refinement operations may be determined based on an index value of a neighboring block searched in the merge mode. In the integer sample search operation of the motion vector refinement process, the search operation is performed on a total of 25 integer coordinates horizontally and vertically from −2 to +2, including the center of the refinement corresponding to the initial motion vector, as shown in FIG. 12. Accordingly, the integer offset for the position of the block with minSAD is expressed as (intOffX, intOffY).

To skip the complex equation solving process according to the sub-pixel-based motion vector refinement operation as shown in Equation 16 and Equation 17, the fractional sample refinement operation may be terminated early after performing a search up to an integer sample of a specific condition in the integer sample search operation. When both intOffX and intOffY are 0, the inter-predictor 124 of the video encoding apparatus may be configured to skip the fractional sample refinement operation of searching for a sub-pixel offset, and set the sub-pixel offset as shown in Equation 17 to zero. Alternatively, when (intOffX, intOffY) is not (0, 0), the inter-predictor 124 may set subPelFlag to the value of 'true' in order to apply the fractional sample refinement operation. Thereby, when (intOffX, intOffY) is (0, 0), the fractional sample refinement operation may be terminated early.

As another aspect of an embodiment of the present disclosure, when the SAD acquired in the integer sample search operation is less than a specific threshold, the inter-predictor 124 is configured to skip the fractional sample refinement operation of searching for sub-pixel offsets for vectors. For example, in addition to minSAD, let the second and third smallest SADs be denoted as SAD_1 and SAD_2, respectively. When the condition expressed as Equation 19 are satisfied, the fractional sample refinement operation may be skipped.

$$\text{Abs(minSAD}-\text{SAD\_1)} < \text{threshold \&\& Abs(minSAD}-\text{SAD\_2)} < \text{threshold} \quad (19)$$

wherein, $\text{Abs}(\cdot)$ is a function that changes an input to an absolute value.

As another aspect of the embodiment according to the present disclosure, the inter-predictor 124 is configured to determine whether to skip the fractional sample refinement operation of searching for a sub-pixel offset for a motion vector, based on the magnitude of the motion vector of a neighboring block searched for in the merge mode. For example, when two or more motion vectors of two or more neighboring blocks searched for in the merge mode are the same or similar (e.g., the difference between the motion vectors is less than a certain threshold), the fractional sample refinement operation may be skipped.

In the merge mode, based on the magnitude of the motion vector searched for at one or more specific indexes, the inter-predictor 124 is configured to determine whether to skip the fractional sample refinement operation of searching for a sub-pixel offset for the motion vector. For example, the fractional sample refinement operation may be skipped in the merge mode, when the values of motion vectors searched for in the top left, bottom left, and top right blocks are equal or have little difference from each other. As another example, when the magnitudes of the motion vectors searched for in the top left, bottom left, and top right blocks are equal to 0 or less than a specific threshold, the fractional sample refinement operation may be skipped.

In the merge mode, the inter-predictor 124 is configured to determine whether to skip the fractional sample refinement operation of searching for a sub-pixel offset for a motion vector, based on a process that motion vectors searched for at one or more specific indexes have been derived. For example, when the values of motion vectors of the top left, bottom left, and top right blocks have been derived without the motion vector refinement process, the motion vector refinement process is not additionally performed in the current block. As another example, when the fractional sample refinement operation of the motion vector refinement process has not been used in the process of deriving the motion vectors of the top left, bottom left, and top right blocks, the fractional sample refinement operation may be skipped in the motion vector refinement process for the current block.

When one or more neighboring blocks (e.g., top left, bottom left, and top right blocks) of the current block use the merge mode and is encoded in the skip mode (i.e., cu_skip_flag==TRUE for the blocks), the image encoding/decoding apparatus is configured to determine that the need for precision of the motion vector of the current block is low, and thus skips the motion vector refinement process. In particular, in skipping the motion vector refining process, only the fractional sample refinement operation may be skipped, or the integer sample search operation including the fractional sample refinement operation may be skipped.

As described above, in the motion vector refinement process according to the present embodiment, the search complexity of the inter-predictor 124 may be reduced by terminating the fractional sample refinement operation early.

The inter-predictor 124 may be configured to perform early termination of the motion vector refinement process, based on the motion information (two motion vectors and two reference pictures) used for prediction, motion vectors of neighboring blocks searched for in the merge mode, and the like. Accordingly, the inter-predictor 544 of the video decoding apparatus may also be configured to perform early termination of the motion vector refinement process in the same manner as in the video encoding apparatus, based on the motion information (motion vectors and reference pictures) used for bi-directional prediction received from the video encoding apparatus, motion vectors of neighboring blocks searched for in the merge mode, and the like. Accordingly, signaling of additional information for early termination of the motion vector refinement process from the video encoding apparatus to the video decoding apparatus is not required.

Hereinafter, as another aspect of the embodiment according to the present disclosure, a method for performing an additional fractional sample refinement operation at the boundary of a search range for the motion vector refinement process will be described.

As described above, when intOffX is −2 or 2 or intOffY is −2 or 2 {(intOffX==(2||−2))||(intOffY=(2||−2))}, the fractional sample refinement operation of the motion vector refinement process is skipped. Since the result of the motion vector refinement is limited to −1.5 to 1.5 according to the condition shown in Equation 18, the compression performance of the video encoding/decoding apparatus may be limited. Accordingly, the motion vector refinement according to the present disclosure may allow the fractional sample refinement operation for a motion vector in units of sub-pixels from −2 to −1.5 and from 1.5 to 2 while limiting the range of integer sample search to −2 to 2, thereby improving compression performance.

Even when intOffX is −2 or 2 or intOffY is −2 or 2, the inter-predictor 124 of the video encoding apparatus may be configured to set subPelFlag to the value of TRUE in order to apply the fractional sample refinement operation. When subPelFlag is set to TRUE, the inter-predictor 124 may be configured to execute a fractional sample refinement operation of searching for a sub-pixel offset in units of at least ¼ pel to execute motion vector refinement for coordinates less than or equal −1.75 or greater than or equal to 1.75. As another example, when subPelFlag is set to the value of TRUE, the inter-predictor 124 may be configured to execute a fractional sample refinement operation of searching for a sub-pixel offset in units of at least ⅛ pel to execute motion vector refinement for the coordinate of −1.875 or 1.875.

Alternatively, by deleting the subPelFlag, the inter-predictor 124 may be configured to execute the fractional sample refinement operation of searching for a sub-pixel offset even when intOffX is −2 or 2 or intOffY is −2 or 2. As described above, when intOffX is −2 or 2 or intOffY is −2 or 2, the inter-predictor 124 may be configured to execute the fractional sample refinement operation of searching for a sub-pixel offset in units of at least ¼ pel to refine the motion vector for the coordinate of −1.75 or 1.75. In addition, when intOffX is −2 or 2 or intOffY is −2 or 2, the motion vector refinement for the coordinate of −1.25 or 1.25 is not performed.

To apply Equation 17, 4 positions of the top, bottom, left, and right are required for (intOffX, intOffY). However, when intOffX is −2 or 2 or intOffY is −2 or 2, there may not exist one or more of the required positions. Accordingly, 4 positions of the top, bottom, left, and right for (intOffX, intOffY) may be set by applying Max(−2, intOffX−1), intOffX, and Min(intOffX+1, 2) in the horizontal direction and applying Max(−2, intOffY−1), intOffY, and Min(intOffY+1, 2) in the vertical direction. In other words, when (intOffX, intOffY) is positioned at the outermost side of 25 points, The outermost point (intOffX, intOffY) may be used as the top, bottom, left, or right position.

The motion vector refinement coding tool described above requires the integer sample search to be performed through SAD calculation for 25 sample positions determined by the initial motion vector, and the fractional sample refinement to be performed according to the parametric error-surface equation, and therefore it may increase complexity. Hereinafter, a simplified motion vector refinement process will be described. The simplified motion vector refinement process may reduce the complexity of the video encoding/decoding apparatus when the fractional sample refinement operation is additionally performed, including even the case where intOffX is −2 or 2 or intOffY is −2 or 2.

In an embodiment of the present disclosure, as shown in FIG. 12, the inter-predictor 124 is configured to calculate the SADs for positions A1, A2, A3, and A4 in the integer sample search operation to find a position having minSAD. When the position having minSAD is A4, the SADs for positions A41, A42, A43, and A44 around A4 are calculated. Based on the calculated SADs, the inter-predictor 124 is configured to execute the fractional sample refinement operation using the parametric error-surface equation as shown in Equation 16 and Equation 17, thereby generating $(x_{min}, y_{min})$ in units of ⅛ pel. Since the above-described process does not satisfy the constraint that the cost of the center point shall be the minimum among the constraints shown in Equation 18, all positions within the search range may be searched for in units of ⅛ pel. This search method reduces the number of searches in the integer sample search operation from 25 to 8, and therefore the search complexity may be significantly reduced.

Figure 13:
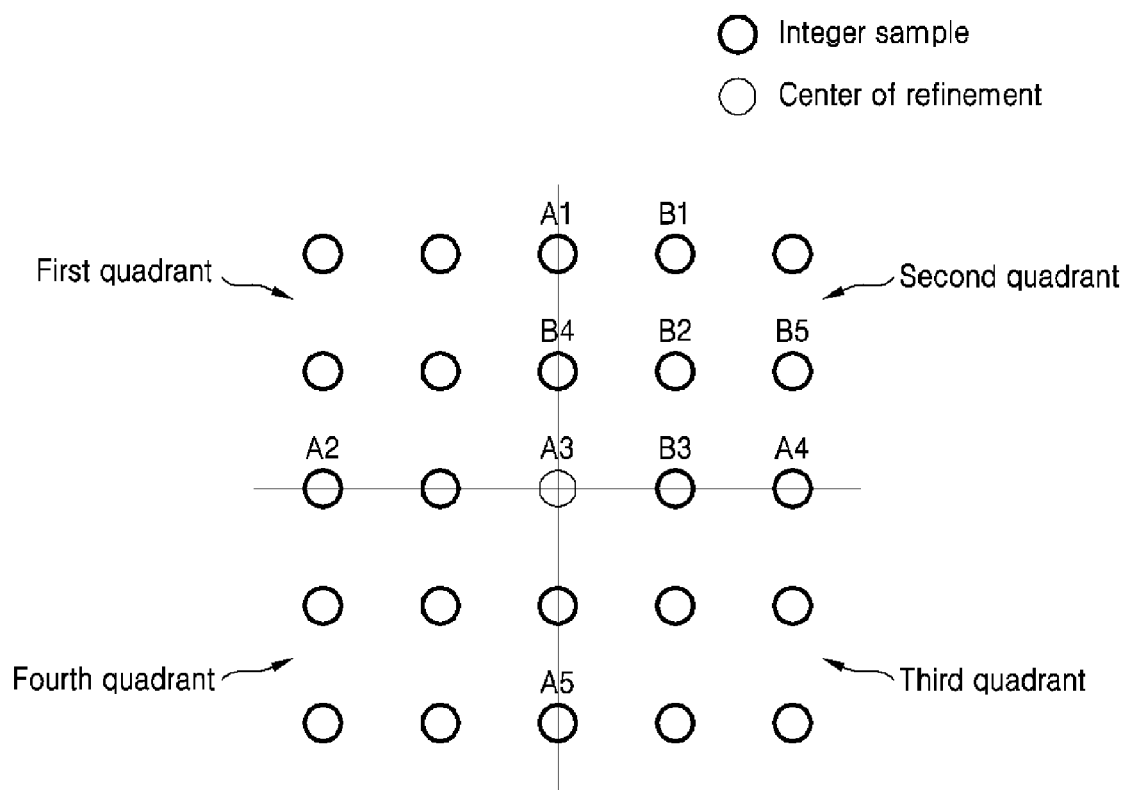
FIG. 13 is an exemplary diagram illustrating a method for reducing search complexity for the motion vector refinement coding tool according to another embodiment of the present disclosure.

In another embodiment of the present disclosure, as shown in FIG. 13, the inter-predictor 124 is configured to calculate the SADs for positions A1, A2, A3, A4, and A5 in the integer sample search operation, and execute the fractional sample refinement operation based on the calculated SADs, thereby generating $(x_{min}, y_{min})$ in units of ¼ pel. The approximate position of $(x_{min}, y_{min})$ is checked among the first to fourth quadrants. Then, when it is positioned in, for example, the second quadrant, the inter-predictor 124 is configured to additionally calculate SADs for positions B1, B2, B3, B4, and B5. Based on the calculated SADs, the inter-predictor 124 is configured to additionally perform a fractional sample refinement operation to generate ($x_{min}$, $y_{min}$) in units of ⅛ pel. The above process does not satisfy the constraint that the cost of the center point shall be the minimum among the constraints shown in Equation 18, and accordingly all positions within the search range may be searched for in units of ⅛ pel. With this search method, the search for 25 sample positions required in the integer sample search operation is replaced with the search for 10 sample positions and an additional fractional sample refinement. Thereby, complexity may be reduced.

In another embodiment of the present disclosure, as shown in FIG. 13, the inter-predictor 124 is configured to calculate SADs for positions A1, A2, A3, A4, and A5 in the integer sample search operation, and execute the fractional sample refinement operation based on the calculated SADs to generate ($x_{min}$, $y_{min}$) in units of ¼ pel. Since the above process does not satisfy the constraint that the cost of the center point shall be the minimum among the constraints shown in Equation 18, all positions within the search range may be searched for in units of ⅛ pel. With this search method, the number of searches in the integer sample search operation may be reduced from 25 to 5. Thereby, the search complexity may be significantly reduced.

Figure 14:
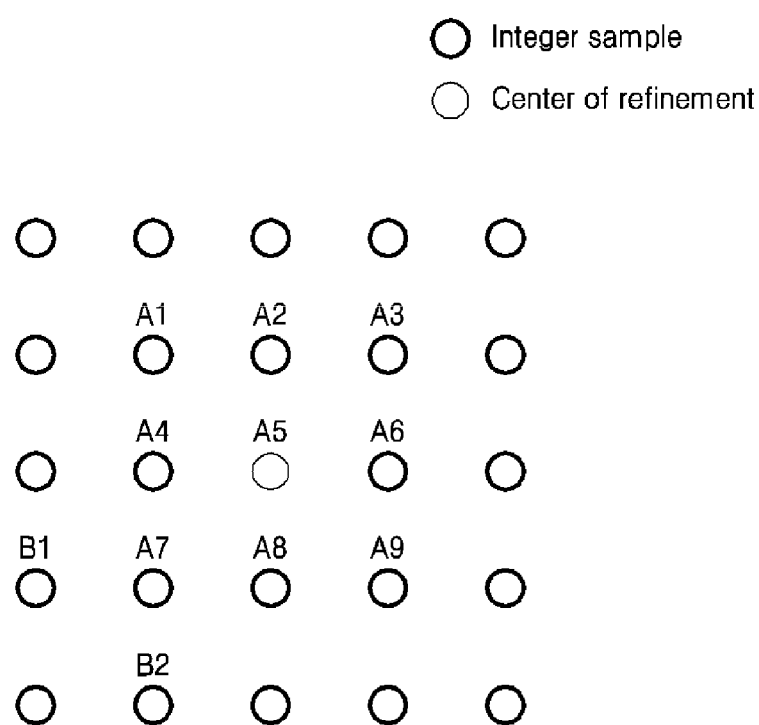
FIG. 14 is an exemplary diagram illustrating a method for reducing search complexity for the motion vector refinement coding tool according to another embodiment of the present disclosure.

In another embodiment of the present disclosure, as shown in FIG. 14, the inter-predictor 124 is configured to calculate SADs for positions A1 to A9 in the integer sample search operation to find a position having minSAD. For example, when A5 is a position having minSAD, the inter-predictor 124 is configured to execute the fractional sample refinement operation based on the SADs pre-calculated for positions A2, A4, A6, and A8 to generate ($x_{min}$, $y_{min}$) in units of ⅛ pel. Since the above-described process does not satisfy the constraint that the cost of the center point shall be the minimum among the constraints shown in Equation 18, all positions within the search range may be searched for in units of ⅛ pel.

When A7 is a position having minSAD according to the result of executing the integer sample search, SADs for positions B1 and B2 are additionally calculated. Based on the SADs for positions A4, A7, A8, B1, and B2, the inter-predictor 124 generates ($x_{min}$, $y_{min}$) in units of ⅛ pel by executing the fractional sample refinement operation. Since the above-described process does not satisfy the constraint that the cost of the center point shall be the minimum among the constraints shown in Equation 18, all positions within the search range may be searched for in units of ⅛ pel. With this search method, the number of searches in the integer sample search operation may be reduced from 25 to a minimum of 8 and a maximum of 11. Thereby, search complexity may be reduced.

As described above, in the motion vector refinement process according to the present embodiment, the compression performance may be increased by extending the search range for the sub-pixel offset, and search complexity may be reduced by simplifying the integer sample search.

The video encoding apparatus may extend the search range of the motion vector refinement process and simplify the search operation, using the motion information (two motion vectors and two reference pictures) used for prediction. Therefore, the inter-prediction unit 544 of the video decoding apparatus may also extend the search range of the motion vector refinement process and simplify the search operation in the same manner as in the video encoding apparatus, using the motion information (motion vectors and reference pictures) for bi-directional prediction received from the video encoding apparatus. Therefore, signaling of additional information from the video encoding apparatus to the video decoding apparatus to simplify the search operation of the motion vector refinement process is not required.

V. High-Level Syntax Signaling

Another aspect of the present disclosure relates to a technique for signaling of high-level syntaxes for controlling on/off of various tools described above. The above-described optical flow, sample-by-sample adjustment for affine motion prediction samples, and motion vector refinement are coding tools used to improve the video encoding efficiency. However, for specific content such as, for example, screen content, the aforementioned various coding tools may not contribute to improving compression performance. Accordingly, a coding unit based signaling of whether to apply each coding tool is applied or a coding unit based decision of whether to apply the tool may rather degrade coding efficiency or increase computational complexity. The present disclosure provides a signaling technique for efficiently controlling the above-described coding tools.

To encode a sequence of pictures, the video encoding apparatus is configured to encode a first high-level syntax element of the sequence level indicating whether each of the above-described a plurality of coding tools is disabled. The first high-level syntax element may be encoded in the header of the sequence, that is, the SPS. In particular, the plurality of coding tools includes at least one of optical flow, sample-by-sample adjustment, and motion vector refinement.

When the first high-level syntax element indicates that each of the plurality of coding tools is not enabled, the corresponding coding tool is applied to the encoding of the sequence. In other words, each of the coding tools described above is not applied to any pictures in the sequence. When the first high-level syntax element indicates that each of a plurality of coding tools is enabled, each of the plurality of coding tools may be used to encode the corresponding sequence. For example, optical flow is applicable to all pictures in the sequence. Additionally, motion vector refinement is applicable to all pictures in the sequence.

The video encoding apparatus is configured to encode a picture level flag indicating whether a corresponding coding tool is allowed in a picture header (i.e., PPS) of each of the pictures belonging to the sequence depending on the value of the first high-level syntax element. For example, when the first high-level syntax element indicates that the corresponding coding tool is allowed at the sequence level, the picture level flag for indicating whether the corresponding coding tool is allowed at the picture level is encoded. When the first high-level syntax element indicates that the corresponding coding tool is not allowed at the sequence level, the picture level flag is not separately coded. In particular, the video decoding apparatus is configured to automatically set the picture level flag to a value indicating that the corresponding coding tool is not allowed.

The video decoding apparatus may be configured to set, at the picture level, whether to allow a corresponding coding tool from the picture level flag signaled from the video encoding apparatus or a picture level flag whose value is automatically set. When the picture level flags for the coding tools according to the present embodiment are not contained in the bitstream, the video decoding apparatus sets each picture level flag to a value indicating that the corresponding coding tools are not allowed at the picture level.

According to the above-described syntax structure, the video encoding apparatus may be configured to adaptively determine whether to allow coding tools at the sequence level and the picture level. In addition, the video decoding apparatus may be configured to adaptively determine whether to allow coding tools at the sequence level and the picture level by decoding the syntaxes signaled from the video encoding apparatus.

In some other embodiments of the present disclosure, the picture level flag of the above-described embodiment may be replaced with a slice level flag. In other words, when the first high-level syntax element indicates that the corresponding coding tool is allowed at the sequence level, the video encoding apparatus encodes, in the slice header, a slice level flag for indicating whether the corresponding coding tool is allowed at the slice level. When the first high-level syntax element indicates that the corresponding coding tool is not allowed, the slice level flag is not coded. The video encoding apparatus may be configured to adaptively determine whether to allow coding tools at the sequence level and the slice level. The video decoding apparatus may be configured to determine whether to allow each tool at the sequence level and the slice level according to the first high-level syntax element or the slice level flag.

In another embodiment of the present disclosure, to encode a sequence of pictures, the video encoding apparatus is configured to encode the first high-level syntax element of the sequence level indicating whether all the coding tools as described above are enabled. The first high-level syntax element may be encoded in the header of the sequence, that is, the SPS. When the first high-level syntax element of the sequence level indicates that any of the plurality of coding tools is not enabled, the corresponding coding tools are not applied to the encoding of the sequence. In other words, none of the coding tools as described above is applied to any pictures in the sequence. When the first high-level syntax element of the sequence level indicates that there is no restriction on use of all the plurality of coding tools, the video encoding apparatus is configured to encode a second high-level syntax element of the slice level indicating whether all the plurality of coding tools are enabled. The second high-level syntax element may be encoded in the header of the slice.

When the second high-level syntax element of the slice level indicates that any of the plurality of coding tools is not enabled, the corresponding coding tools are not applied to the encoding of the corresponding slice. In other words, none of the coding tools as described above is applied to the slice. When the second high-level syntax element of the slice level is 0, there is no restriction on use of all the plurality of coding tools. In addition, when the first high-level syntax element of the sequence level indicates that all the plurality of coding tools is disabled, the second high-level syntax element of the slice level is set not to enable any of the plurality of coding tools, and the corresponding coding tools are not applied to the encoding of the corresponding slice.

In addition, in some other embodiments according to the present disclosure, the second high-level syntax element of the slice level as described above may be replaced with the second high-level syntax element of the picture level. The second high-level syntax element may be encoded in the header (i.e., PPS) of the picture. When the second high-level syntax element of the picture level indicates that all the plurality of coding tools is disabled, the corresponding coding tools are not applied to the encoding of the picture. In other words, any of the coding tools as described above is not applied to the picture. When the second high-level syntax element of the picture level is 0, there is no restriction on use of all the plurality of coding tools. In addition, when the first high-level syntax element of the sequence level indicates that all the plurality of coding tools is disabled, the second high-level syntax element of the picture level is set not to enable any of the plurality of coding tools, and the corresponding coding tools are not applied to the encoding of the picture.

As described above, according to the present embodiment, by providing a method of simply performing the integer sample search operation and the fractional sample refinement operation in relation to motion vector refinement among coding tools for improving the compression performance of inter-prediction, the coding efficiency of the encoder/decoder may be increased, and accordingly complexity may be reduced.

Various functions or methods described in the present disclosure may be implemented with instructions stored in a non-transitory recording medium that can be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

REFERENCE NUMERALS

124: Inter-predictor
155: Entropy encoder
510: Entropy decoder
544: Inter-predictor

What is claimed is:
1. A video decoding apparatus, comprising:
A memory; and
one or more processors configured to:
  decode, from a bitstream, at least one first high level syntax element indicating whether each of at least one coding tool is allowed, the at least one coding tool including a motion vector refinement;
  decode, from the bitstream, a second high level syntax element corresponding to each of the at least one coding tool depending on the at least one first high level syntax element, and setting, at a picture level, whether each of the at least one coding tool is allowed;
  in response to identifying that the motion vector refinement is allowed for a current picture including a target block based on the setting at the picture level, generating a refined motion vector for the target block, by calculating, for pairs of two candidate blocks which are within a preset offset range from initial motion vectors in bi-directional reference pictures of the target block, metrics between the two candidate blocks and searching for a motion vector candidate having a minimum metric;
  generate inter-predicted samples for the target block using the bi-directional reference pictures and the refined motion vector;

obtain residual samples for the target block; and
decode the target block based on the residual samples and the inter-predicted samples,
wherein the first high level syntax element is decoded from a header of a sequence.

2. The video decoding apparatus of claim 1, wherein the one or more processors is further configured to:
when the first high level syntax element indicates that the motion vector refinement is allowed, decode, from a picture header of each of the pictures belonging to a sequence, a picture level flag indicating whether the motion vector refinement is allowed.

3. The video decoding apparatus of claim 2, wherein, when the first high level syntax element indicates that the motion vector refinement is not allowed, the picture level flag is set to a value indicating that the motion vector refinement is not allowed without being decoded from the picture header.

4. The video decoding apparatus of claim 1, wherein, when the first high level syntax element indicates that the motion vector refinement is not allowed, a coding tool for the motion vector refinement is not allowed for any of the pictures in the sequence.

5. The video decoding apparatus of claim 1, wherein the one or more processors is further configured to:
perform an integer sample search operation of searching for an integer offset corresponding to a position having the minimum metric by calculating the metrics for pairs of the two candidate blocks which correspond to a pair of initial positions indicated by the initial motion vectors and pairs of two neighboring positions displaced from the initial positions in integer sample units, wherein the neighboring positions in the integer sample units have a square distribution around each of the initial positions;
perform a fractional sample refinement operation of, when the integer offset is not positioned at an outermost side of the square distribution, searching for an optimal sub-pixel offset by solving a parametric error surface equation using the position with the minimum metric and top, bottom, left, and right neighboring positions of the position with the minimum metric; and
generate an offset between the initial motion vector and the refined motion vector by adding the sub-pixel offset to the integer offset.

6. The video decoding apparatus of claim 5, wherein, when the metric between the two candidate blocks corresponding to the initial motion vectors is less than a preset first threshold, both the integer sample search operation and the fractional sample refinement operation are skipped.

7. The video decoding apparatus of claim 5, wherein, when the integer offset is zero, the fractional sample refinement operation is skipped.

8. The video decoding apparatus of claim 5, wherein when each of differences between the minimum metric and metrics which are acquired at integer coordinates of two or more positions in the integer sample search operation is less than a preset second threshold, the fractional sample refinement operation is skipped.

9. The video decoding apparatus of claim 5, wherein, when the initial motion vectors for the target block are generated by a merge mode, whether to execute the integer sample search operation or the fractional sample refinement operation is determined depending on magnitudes of motion vectors of neighboring blocks considered as merge candidates or a coding mode applied to the neighboring blocks.

10. A encoding apparatus, comprising:
a memory; and
one or more processors configured to:
encode at least one first high level syntax element indicating whether each of at least one coding tool is allowed, the at least one coding tool including motion vector refinement;
encode a second high level syntax element of a picture level related to whether each of the at least one coding tool is allowed depending on the at least one first high level syntax element;
in response to identifying that the motion vector refinement is allowed for a current picture including a target block based on setting of the picture level, generating a refined motion vector for the target block, by calculating, for pairs of two candidate blocks which are within a preset offset range from initial motion vectors in bi-directional reference pictures of the target block, metrics between the two candidate blocks and searching for a motion vector candidate having a minimum metric;
generate inter-prediction samples for the target block using the bi-directional reference pictures and the refined motion vector
generate residual samples based on the target block and the inter-prediction samples; and
encode the residual samples,
wherein the first high level syntax element is encoded in a header of a sequence.

11. The video encoding apparatus of claim 7, wherein the one or more processors is further configured to:
when the first high level syntax element indicates that the motion vector refinement is allowed, encode, in a picture header of each of the pictures belonging to a sequence, a picture level flag indicating whether the motion vector refinement is allowed.

12. The video encoding apparatus of claim 7, wherein the one or more processors is further configured to:
perform an integer sample search operation of searching for an integer offset corresponding to a position having the minimum metric by calculating the metrics for pairs of the two candidate blocks which correspond to a pair of initial positions indicated by the initial motion vectors and pairs of two neighboring positions displaced from the initial positions in integer sample units, wherein the neighboring positions in the integer sample units have a square distribution around each of the initial positions;
perform a fractional sample refinement operation of, when the integer offset is not positioned at an outermost side of the square distribution, searching for an optimal sub-pixel offset by solving a parametric error surface equation using the position with the minimum metric and top, bottom, left, and right neighboring positions of the position with the minimum metric; and
generate an offset between the initial motion vector and the refined motion vector by adding the sub-pixel offset to the integer offset.

13. The video encoding apparatus of claim 9, wherein, when the metric between the two candidate blocks corresponding to the initial motion vectors is less than a preset first threshold, both the integer sample search operation and the fractional sample refinement operation are skipped.

14. A non-transitory computer readable medium storing a bitstream containing an encoded video data, the encoded video data being decoded from the bitstream by processes of:

decoding, from a bitstream, at least one first high level syntax element indicating whether each of at least one coding tool is allowed, the at least one coding tool including a motion vector refinement;

decoding, from the bitstream, a second high level syntax element corresponding to each of the at least one coding tool depending on the at least one first high level syntax element, and setting, at a picture level, whether each of the at least one coding tool is allowed;

in response to identifying that the motion vector refinement is allowed for a current picture including a target block based on the setting at the picture level, generating a refined motion vector for the target block, by calculating, for pairs of two candidate blocks which are within a preset offset range from initial motion vectors in bi-directional reference pictures of the target block, metrics between the two candidate blocks and searching for a motion vector candidate having a minimum metric;

generating inter-predicted samples for the target block using the bi-directional reference pictures and the refined motion vector obtaining residual samples for the target block; and decoding the target block based on the residual samples and the inter-predicted samples, wherein the first high level syntax element is decoded from a header of a sequence.

* * * * *